US008780330B2

(12) United States Patent
Wada et al.

(10) Patent No.: US 8,780,330 B2

(45) Date of Patent: Jul. 15, 2014

(54) OPTICAL DISTANCE-MEASURING DEVICE AND ELECTRONIC DEVICE

(75) Inventors: Hideo Wada, Osaka (JP); Akifumi Yamaguchi, Osaka (JP); Masaru Kubo, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 246 days.

(21) Appl. No.: 13/534,581

(22) Filed: Jun. 27, 2012

(65) Prior Publication Data

US 2013/0003039 A1 Jan. 3, 2013

(30) Foreign Application Priority Data

Jun. 29, 2011 (JP) ................................ 2011-144820
Mar. 28, 2012 (JP) ................................ 2012-074786

(51) Int. Cl.
*G01C 3/08* (2006.01)

(52) U.S. Cl.
USPC .......................................... 356/4.01; 356/4.1

(58) Field of Classification Search
USPC ............ 356/3.01–3.15, 4.01–4.1, 5.01–5.15, 356/6–22, 28, 28.5
See application file for complete search history.

(56) References Cited

U.S. PATENT DOCUMENTS

| | | | | |
|---|---|---|---|---|
| 6,046,795 | A | 4/2000 | Sugiyama et al. | |
| 6,337,736 | B1 | 1/2002 | Sugiyama et al. | |
| 7,391,582 | B2 * | 6/2008 | Inui et al. | 359/819 |
| 2011/0194097 | A1 * | 8/2011 | Yamaguchi et al. | 356/4.01 |

FOREIGN PATENT DOCUMENTS

| | | | |
|---|---|---|---|
| JP | 11-281351 | A | 10/1999 |
| JP | 2000-331577 | A | 11/2000 |
| JP | 2001-99643 | A | 4/2001 |
| JP | 2002-016196 | A | 1/2002 |
| JP | 2002-083917 | A | 3/2002 |
| JP | 2006-337320 | A | 12/2006 |
| JP | 2011-043433 | A | 3/2011 |
| JP | 2012-37276 | A | 2/2012 |

* cited by examiner

*Primary Examiner* — Luke Ratcliffe

(74) *Attorney, Agent, or Firm* — Birch, Stewart, Kolasch & Birch, LLP

(57) ABSTRACT

A lens frame, made from metal, retaining a light-emitting lens and a light-receiving lens is retained between a second mold and a third mold both of which are made from light-shielding resins. The lens frame has an asperity structure on its front and back surfaces. This greatly enhances adhesiveness between the light-emitting lens and the lens frame and adhesiveness between the light-receiving lens and the lens frame, thus preventing sliding of the light-emitting lens and the light-receiving lens over the lens frame.

15 Claims, 19 Drawing Sheets

OPTICAL DISTANCE-MEASURING DEVICE AND ELECTRONIC DEVICE

This Nonprovisional application claims priority under 35 U.S.C. §119(a) on Japanese Patent Application Nos. 2011-144820 filed on Jun. 29, 2011 and 2012-74786 filed on Mar. 28, 2012, the entire contents of which are hereby incorporated by reference.

TECHNICAL FIELD

The present invention relates to an optical distance-measuring device that optically measures a distance to an object subject to distance measurement. Particularly, the present invention relates to an optical distance-measuring device having a high distance measurement accuracy even when it thermally expands or contracts due to temperature changes caused during reflow or the like, and to an electronic device including the optical distance-measuring device.

BACKGROUND ART

FIG. 12 is an explanatory view of the principle of a typical triangulation method.

As shown in FIG. 12, the conventional and general optical distance-measuring device includes, for example, a light-emitting element 201, a light-receiving element 202, a light-emitting lens 203, and a light-receiving lens 204.

In the optical distance-measuring device, light flux emitted from the light-emitting element 201 placed at the origin (0, 0) is turned into substantially parallel light flux (light-emission axis 205) by the light-emitting lens 203 placed at the point A (0, d). The substantially parallel light flux is applied as spot light onto the point B (0, y) on an object 211 subject to distance measurement. Light flux (light-receptive axis 206) reflected by the object 211 subject to distance measurement is gathered by the light-receiving lens 204 (light-gathering lens) placed at the point C (L, d), and the gathered light forms a light-receiving spot by being focused on the point D (L+1. 0) on the light-receiving element 202, which is placed on an axis lying along an x-direction. Here, assume that the point E (L, 0) is a point at which a line passing through the point C (center of the light-receiving lens 204) and being parallel to a y-axis intersects with a light-receiving surface of the light-receiving element 202. In this case, a triangle ABC is similar to a triangle ECD. Therefore, when the position of the light-receiving spot is detected by means of the light-receiving element 202 to measure a side ED (=1), a distance y to the object 211 subject to distance measurement is calculated by the following equation (1):

$$y = \frac{L \cdot d}{l}. \tag{1}$$

As described above, the optical distance-measuring device detects the position of a light-receiving spot formed on the light-receiving element 20, and calculates the distance to the optical distance-measuring device in accordance with the equation (1). In order to measure the distance accurately, a distance L between the light-emitting lens 203 and the light-receiving lens 204 and a distance d between the light-receiving lens 204 and the light-receiving element 202 need to be fixed.

FIG. 13 is a cross-sectional view showing the configuration of a typical optical distance-measuring device 300 using the above principle.

As shown in FIG. 13, the optical distance-measuring device 300 includes a light-emitting element 201, the light-receiving element 202, the light-emitting lens 203, and the light-receiving lens 204, all of which are retained by a case 301. The case 301 is usually made from a light-shielding resin for cost reduction.

In the optical distance-measuring device 300, the case 301, which is usually formed from a resin having a high thermal expansion coefficient, expands and contracts due to ambient temperature changes. This causes the following problem. For example, expansion of the case 301 due to rise in ambient temperature causes shifts of the light-emitting lens 203 and the light-receiving lens 204 to the positions indicated by broken lines, respectively. This changes (increases) the distance L between the lenses. As a result, an optical axis 205*a* of the light-emitting lens 203 and an optical axis 206*a* of the light-receiving lens 204 at room temperature turn to an optical axis 205*b* and an optical axis 206*b* as indicated by broken lines, respectively. In this case, the position of a light-receiving spot formed on the light-receiving element 202 shifts outwards as compared with the position of the light-receiving spot at room temperature while the position of the object 211 subject to distance measurement remains unchanged. Thus, at the rise in ambient temperature, for example, the position of the object 211 subject to distance measurement is incorrectly measured as being closer than its actual position.

Patent Literatures 1 and 2 disclose the techniques that solve the above problem. FIG. 14 is a cross-sectional view showing the configuration of an optical distance-measuring device 400 described in Patent Literature 1. FIG. 15 is a cross-sectional view showing the configuration of an optical distance-measuring device 500 described in Patent Literature 2.

As shown in FIG. 14, the optical distance-measuring device 400 includes a light-emitting element 401, a light-receiving element 402, a floodlighting lens (light-emitting lens) 403, and a light-receiving lens 404. The floodlighting lens 403 and a package 405 to house the light-emitting element 401 are fixed in a first case 406, while the light-receiving lens 404 and a package 407 to house the light-emitting element 402 are fixed in a second case 408. The first case 406 and the second case 408 are connected to each other with a main unit 409, which constitutes a main case 410.

In the optical distance-measuring device 400 with such configuration, even when thermal expansion of the main case 410 occurs, the light-emitting element 401 and the floodlighting lens 403 are kept in position to each other in the first case 406, and the light-receiving element 402 and the light-receiving lens 404 are kept in position to each other in the second case 408. This causes no changes in distance from the center position of the light-receiving element 402 to the position of a reflected light spot, which secures an accuracy of distance measurement.

As shown in FIG. 15, the optical distance-measuring device 500 includes an imaging lenses 501*a* and 501*b*, a retainer 502 for the imaging lenses 501*a* and 501*b*, a CCD packages 503*a* and 503*b* (optical sensor arrays), and a retainer 504 for the CCD packages 503*a* and 503*b*. In the optical distance-measuring device 500, the imaging lenses 501*a* and 501*b* and the retainers 502 and 504 are all formed from the same material which is made from non-hygroscopic plastic.

In the optical distance-measuring device 500 with such configuration, the imaging lenses 501*a* and 501*b* and the retainers 502 and 504 stretch evenly by thermal expansion.

This makes it possible to prevent decreased distance measurement accuracy caused by temperature changes.

In the case of the optical distance-measuring devices 400 and 500, the light-emitting element, the light-receiving element, and the lens retainers evenly expand and contract at the occurrence of ambient temperature changes, the light-emitting element and the light-receiving element are kept in position to the lenses to satisfy the principle of triangulation. However, the optical distance-measuring devices 400 and 500 have the following problem. That is, in the event of the occurrence of self-heating in the light-emitting element and the light-receiving element, uneven temperature changes in the entire device cause differences in temperature between the components located near the light-emitting element or the light-receiving element and the components located near the lenses. Accordingly, expansion and contraction of the components occur in different amounts. This causes a failure to keep the light-emitting element and the light-receiving element in position to the lenses.

Any methods for correcting the position of the light-receiving spot at the occurrence of such uneven temperature changes are not described in Patent Literatures 1 and 2. Therefore, the techniques described in Patent Literatures 1 and 2 cannot prevent decreased distance measurement accuracy caused by self-heating of the light-emitting element and the light-receiving element, which results in unsatisfactory utilization of the principle of triangulation method.

A technique for resolving such a problem is disclosed in Patent Literature 3. FIG. 16 is a cross-sectional view showing the configuration of an optical distance-measuring device 600 described in Patent Literature 3.

As shown in FIG. 16, the optical distance-measuring device 600 includes a pair of lenses 601*a* and 601*b*, a pair of CCD packages 602*a* and 602*b*, a lens retainer 603, a CCD retainer 604, and temperature sensors 605 and 606. The temperature sensor 605 is mounted on the lens retainer 603 in an area between the lenses 601*a* and 601*b*. The temperature sensor 606 is mounted on the retainer 604 in an area between the CCD packages 602*a* and 602*b*.

In the optical distance-measuring device 600 with such configuration, outputs of the temperature sensors 605 and 606 are used to obtain temperature difference between the lens retainer 603 and the CCD retainer 604 at the occurrence of self-heating of CCD chips 607*a* and 607*b* (light-receiving elements) in the respective CCD packages 602*a* and 602*b*. The obtained temperature difference is used to correct the amount of shift of object images formed on the CCD chips 607*a* and 607*b*. This makes it possible to correct difference in degree of thermal expansion between the lens retainer 603 and the CCD retainer 604 at the occurrence of self-heating of the CCD chips 607*a* and 607*b*, and to thus maintain distance measurement accuracy.

However, in the optical distance-measuring device 600, the temperature sensors 605 and 606 are necessary for preventing decreased distance measurement accuracy. Further, the temperature sensors 605 and 606 cannot be embedded in the CCD chips 607*a* and 607*b*, or other components, and must be separately disposed in contact with the lens retainer 603 and the CCD retainer 604, respectively. Besides, the temperature sensors 605 and 606 require wirings for transmission of output signals from the temperature sensors 605 and 606. This complicates the structure of the optical distance-measuring device 600, thus resulting in increased number of steps for assembly of the optical distance-measuring device 600 and difficulty in offering the optical distance-measuring device 600 at low cost.

One approach for realizing the optical distance-measuring device 600 with more simplified structure is considered to provide only one of the temperature sensors 605 and 606. However, this approach causes the problems described below.

FIG. 17 is a cross-sectional view showing the configuration of a conventional optical distance-measuring device 700.

As shown in FIG. 17, the optical distance-measuring device 700 is such that ambient heat evenly heats or cools the entire optical distance-measuring device 700 including its side surfaces and expands or contracts the components. This changes a distance between a light-emitting lens 703 and a light-receiving lens 704 and a distance between a light-emitting element 701 and a light-receiving element 702. Meanwhile, self-heating of the light-emitting element 701 and the light-receiving element 702 due to energization directly heats and expands a light-shielding resin section 705 in which the elements 701 and 702 are sealed. Further, heat emitted from the light-emitting element 701 and the light-receiving element 702 and heat transferred from the light-shielding resin section 705 to a lens retainer 706 that retains the light-emitting lens 703 and the light-receiving lens 704 indirectly heats and expands lens retaining parts of the lens retainer 706.

Therefore, when self-heating occurs, the light-shielding resin section 705 and the lens retainer 706, which are different in temperature from each other, expand depending upon their own thermal expansion coefficients, according to their respective temperature changes. Therefore, the amount of change in distance between the light-emitting lens 703 and the light-receiving lens 704 varies as follows. That is, when the optical distance-measuring device 700 is heated by ambient heat, the distance changes in amounts as indicated by arrows I. On the other hand, when the optical distance-measuring device 700 is heated by self-heating, the distance changes in amounts as indicated by arrows J.

Hence, in order to predict how much the distance between the elements 701 and 702 and the distance between the lenses 703 and 704 change, the optical distance-measuring device 700 needs to be provided with temperature sensors for detecting the temperatures of the light-shielding resin section 705 and the lens retainer 706 separately.

Even in the optical distance-measuring device 600, the amount of change in distance between the lenses 601*a* and 601*b* varies from the case where the optical distance-measuring device 600 is heated by ambient heat to the case where it is heated by self-heating. If the optical distance-measuring device 600 is configured to have the temperature sensor 605 mounted only on the lens retainer 603 or to have the temperature sensor 606 mounted only on the CCD retainer 604, the following inconvenience is caused. For example, in a case where temperature rise occurs, it is unclear whether temperature changes have been caused by rise in ambient temperature or self-heating. This causes a failure to exactly figure out a positional relation between the lenses 601*a* and 601*b* and the CCD chips 607*a* and 607*b*, resulting in decreased distance measurement accuracy.

For the optical distance-measuring device 300 shown in FIG. 13, for example, one approach for suppressing changes in distance between the light-emitting lens and the light-receiving lens due to thermal expansion caused by ambient heat and self-heating is considered to make part of the case 301, which retains the light-emitting lens 203 and the light-receiving lens 204, formed from metal. Specifically, a retaining part for the light-emitting lens 203 and the light-receiving lens 204 is realized by a metallic frame (lens frame), and the lens frame is attached to the case 301. Since some parts of the case 301 are made from metal having a low thermal expansion coefficient, it is possible to suppress the change in distance between the light-emitting lens and the light-receiving lens due to thermal expansion, and to eliminate variations of the change in distance between the light-emitting lens and the light-receiving lens due to thermal expansion caused by ambient heat and self-heating. Further, it is possible to realize cost reduction as compared with the configuration with the case 301 entirely made from metal.

CITATION LIST

Patent Literatures

Patent Literature 1

Japanese Patent Application Publication, Tokukai, No. 2006-337320 A (Publication Date: Dec. 14, 2006)

Patent Literature 2

Japanese Patent Application Publication, Tokukaihei, No. 11-281351 A (Publication Date: Oct. 15, 1999)

Patent Literature 3

Japanese Patent Application Publication, Tokukai, No. 2001-99643 A (Publication Date: Apr. 13, 2001)

SUMMARY OF INVENTION

Technical Problem

Meanwhile, in order to make an electronic device equipped with an optical distance-measuring device, it is necessary to mount the optical distance-measuring device on a substrate or the like. The mounting process requires, for input and output of signals to and from the light-emitting element and the light-receiving element and for supply of power to them, that a plurality of terminals provided on the lead frame where the light-emitting element and the light-receiving element are mounted are soldered to the substrate.

With recent miniaturization of optical distance-measuring devices, spacing between the terminals is getting small. Further, there is a demand for effective mass production of electronic devices equipped with such miniaturized optical distance-measuring devices. In view of this, reflow soldering as means for soldering the terminals is highly demanded rather than the conventional soldering by hand.

When the optical distance-measuring devices are run through a reflow furnace, they are exposed to high temperatures of not less than 260° C. for a short period of time. In this case, the resins forming the components such as the light-emitting lens, the light-receiving lens, the light-emitting element, the light-receiving element, the case, and an element sealing section for sealing the light-emitting lens and the light-receiving lens expand according to their thermal expansion coefficients. In the similar manner, the leadframe and the lens frame expand according to their thermal expansion coefficients.

However, the thermal expansion coefficients of the metals making up the leadframe and the lens frame are lower than those of the resins. This generates stresses resulting from difference in thermal expansion coefficient at the interface between the leadframe and the element sealing section, at the interface between the lens frame and the case, and at the interface between the lens frame and the lens. Further, when the optical distance-measuring devices are taken out of the reflow furnace, they are rapidly cooled down to temperatures near room temperature. This causes rapid contraction of the optical distance-measuring devices having been expanded in high-temperature atmosphere.

In the process from heating to cooling, in terms of the lenses and the lens frame, for example, if adhesiveness between the lenses and lens frame is insufficient, the lenses slide over the lens frame due to the stress generated at the interface between the lenses and the lens frame during a rise in temperature in a high-temperature atmosphere. Further, the stress works at the interface between the lenses and the lens frame during a rapid drop in the temperature to room temperature, and the lenses slide over the lens frame. This causes changes in relative positional relation between the light-emitting lens and the light-emitting element and relative positional relation between the light-receiving lens and the light-receiving element, as compared with the relative positional relations obtained before the optical distance-measuring devices are mounted through reflow. This results in shift of the position of the light-receiving spot, as explained above about the principle of triangulation. The distance obtained by calculation through the aforementioned equation (1) using the obtained positions is different from the actual distance.

If sliding occurred at the cooling is exactly opposite to the sliding occurred at the previous heating, the positional relations between the light-emitting lens and the lens frame and between the light-receiving lens and the lens frame return to their original positional relations, and the above problem caused by reflow does not occur. However, in practice, the positional relations between the light-emitting lens and the lens frame and between the light-receiving lens and the lens frame do not return to their original positional relations.

In terms of the interfaces between the light-emitting lens and the lens frame and between the light-receiving lens and the lens frame, a vector of strain generated at the interface from the expansion caused at the heating is not completely opposite to a vector of strain generated at the interface from the contraction caused at the cooling. For example, since a temperature rise profile is different from a temperature drop profile during reflow, interior temperature distribution in the interface at the heating is not symmetric with respect to interior temperature distribution in the interface at the cooling. This causes difference between the sliding occurred at the heating and the sliding occurred at the cooling, thus changing relative positions of the light-emitting lens and the light-receiving lens with respect to the light-emitting element and the light-receiving element.

Thus, even if a metallic lens frame is used, sliding occurs at the interface between the lens frame and the resin components due to rapid heating and cooling. This causes the problem that an accuracy of distance measurement decreases.

Solution to Problem

An object of the present invention is to provide an optical distance-measuring device with high heat resistance and high accuracy.

An optical distance-measuring device according to the present invention is an optical distance-measuring device that measures a distance to an object subject to distance measurement, including: a light-emitting element mounted on a mounting member; a light-emitting lens, formed from a light-transmitting resin, that irradiates the object subject to distance measurement with light emitted from the light-emitting element; a light-receiving element, mounted on the mounting member, that detects a position of convergence of light reflected by the object subject to distance measurement; a light-receiving lens, formed from a light-transmitting resin, that causes the reflected light to converge onto the light-receiving element; light-transmitting resin members that causes the light-emitting element and the light-receiving element to be sealed therewith; a first light-shielding resin member that covers the light-transmitting resin member so as to form an interior space that allows the light emitted from the light-emitting element to reach the light-emitting lens and an interior space that allows the reflected light entered from the light-receiving lens to reach the light-receiving element; a lens frame, formed from metal, that retains the light-emitting lens and the light-receiving lens; and a second light-shielding resin member that causes the lens frame and the first light-shielding resin member to be sealed therewith, the lens frame having an asperity structure on its front and back surfaces at least in an area where the light-emitting lens and the light-receiving lens are formed.

In the above configuration, the asperity structure is formed on the front surface and/or back surface of the lens frame. This allows the light-transmitting resin making up the light-emitting lens and the light-receiving lens to get into the asperity structure, and thus enhances adhesiveness between the light-transmitting resin and the lens frame. With this configuration, even when stresses work at the interfaces between the light-emitting lens and the lens frame and between the light-receiving lens and the lens frame due to ambient temperature changes caused during reflow, sliding does not occur at the interfaces. Therefore, after the reflow process, the light-emitting lens and the light-receiving lens are kept in relative position to the light-emitting element and the light-receiving element. Thus, it is possible to enhance heat resistance and distance measurement accuracy of the optical distance-measuring device.

Another optical distance-measuring device of the present invention is an optical distance-measuring device that measures a distance to an object subject to distance measurement, including: a light-emitting element mounted on a mounting member; a light-emitting lens, formed from a light-transmitting resin, that irradiates the object subject to distance measurement with light emitted from the light-emitting element; a light-receiving element, mounted on the mounting member, that detects a position of convergence of light reflected by the object subject to distance measurement; a light-receiving lens, formed from a light-transmitting resin, that causes the reflected light to converge onto the light-receiving element; light-transmitting resin members that causes the light-emitting element and the light-receiving element to be sealed therewith; a first light-shielding resin member that covers the light-transmitting resin member so as to form an interior space that allows the light emitted from the light-emitting element to reach the light-emitting lens and an interior space that allows the reflected light entered from the light-receiving lens to reach the light-receiving element; a lens frame, formed from metal, that has the light-emitting lens and the light-receiving lens provided thereto; and a second light-shielding resin member that causes the lens frame and the first light-shielding resin member to be sealed therewith, wherein in at least either positions (i) between the light-emitting lens and the first light-shielding resin member and between the light-receiving lens and the first light-shielding resin member or positions (ii) between the light-emitting lens and the second light-shielding resin member and between the light-receiving lens and the second light-shielding resin member, gaps are formed to avoid contact of the light-emitting lens and the light-receiving lens with the first and second light-shielding resin members due to thermal expansion.

In the above configuration, the resins making up the light-receiving lens and the light-emitting lens and the resins making up the first and second light-shielding resin members are expanded according to their thermal expansion coefficients during reflow process. However, even when expanded within the gaps, the resins making up the light-receiving lens and the light-emitting lens do not come into contact with the first and second light-shielding resin members. This eliminates working of stresses caused by their expansions. Therefore, after the reflow process, the light-emitting lens and the light-receiving lens are kept in relative position to the light-emitting element and the light-receiving element. Thus, it is possible to enhance heat resistance and distance measurement accuracy of the optical distance-measuring device.

Advantageous Effects of Invention

With the above-described configurations, an optical distance-measuring device according to the present invention brings the effect of facilitating high heat resistance and high accuracy of the optical distance-measuring device.

BRIEF DESCRIPTION OF DRAWINGS

FIG. 1 is a plan view showing the configuration of an optical distance-measuring device according to First Embodiment of the present invention.

FIG. 1(*b*) is a cross-sectional view taken along a M-M line shown in the plan view of FIG. 1(*a*).

FIG. 3(*b*) is a cross-sectional view taken along an N-N line shown in the plan view of FIG. 3(*a*).

FIG. 5(*b*) is a cross-sectional view taken along an O-O line shown in the plan view of FIG. 5(*a*).

FIG. 9(*b*) is a cross-sectional view taken along a P-P line shown in the plan view of FIG. 9(*a*).

FIG. 11(*b*) is a cross-sectional view taken along a Q-Q line shown in the plan view of FIG. 11(*a*).

FIG. 18(*b*) is a cross-sectional view taken along an R-R line shown in the plan view of FIG. 18(*a*).

DESCRIPTION OF EMBODIMENTS

First Embodiment

Figure 1:
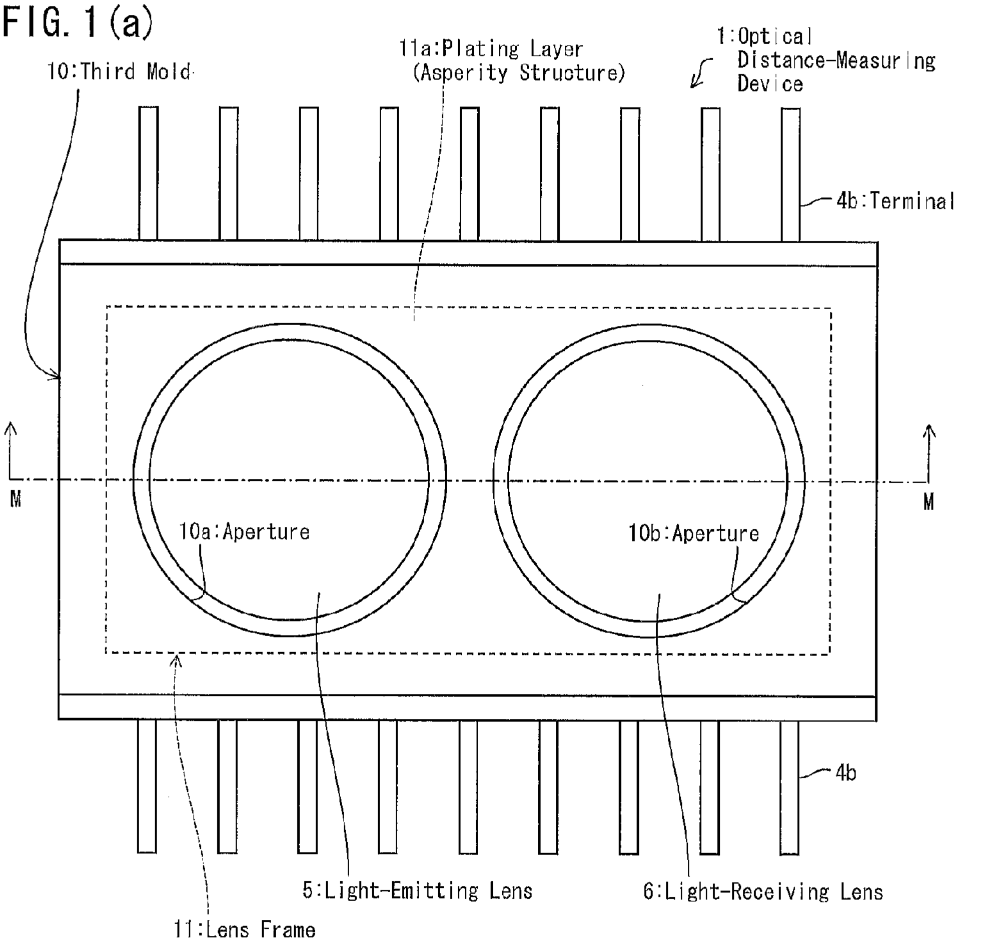
FIG. 1(*a*)
Figure 1:
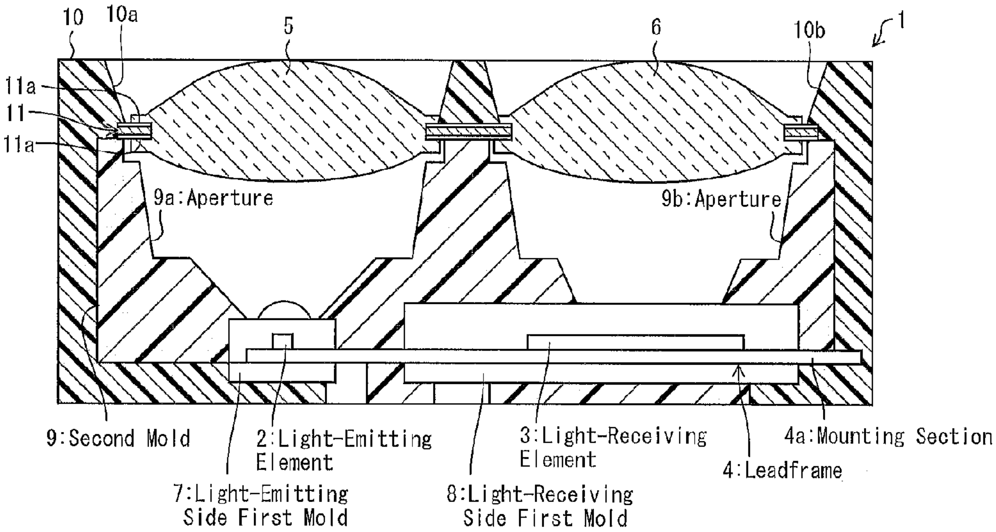

The following will describe one embodiment according to the present invention with reference to FIGS. 1(*a*), 1(*b*), 2, and 7.

[Configuration of Optical Distance-Measuring Device]

Figure 2:
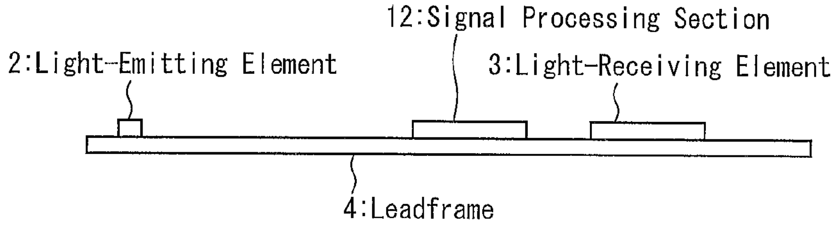
FIG. 2 is a side view showing arrangements of a light-emitting element and a light-receiving element in the optical distance-measuring device.

FIGS. 1(*a*) and 1(*b*) are a plan view and a cross-sectional view, respectively, showing the configuration of an optical distance-measuring device 1 according to one embodiment of the present invention. FIG. 2 is a side view showing arrangements of a light-emitting element 2 and a light-receiving element 3 disposed in the optical distance-measuring device 1.

The optical distance-measuring device 1 according to the present embodiment is a device for measuring a distance to an object subject to distance measurement. As shown in FIGS. 1(*a*) and 1(*b*), the optical distance-measuring device 1 includes the light-emitting element 2, the light-receiving element 3, a leadframe 4, a light-emitting lens 5, a light-receiving lens 6, a light-emitting side first mold 7, a light-receiving side first mold 8, a second mold 9, a third mold 10, and a lens frame 11.

The leadframe 4 (mounting member) has a mounting section 4*a* and a plurality of terminals 4*b*. The mounting section 4*a* is formed in flat plate shape so as to have the light-emitting element 2 and the light-receiving element 3 mounted thereon. The terminals 4*b* are formed integrally with the mounting section 4*a* so as to extend in a direction orthogonal to an M-M line from two opposite external wall surfaces on longitudinal sides of the optical distance-measuring device 1.

The light-emitting element 2 is mounted at one end of the mounting section 4*a* of the leadframe 4 and sealed with the light-emitting side first mold 7 (light-transmitting resin) that is made from a light-transmitting resin. Meanwhile, the light-receiving element 3 is mounted at the other end of the mounting section 4*a* of the leadframe 4 and sealed with the light-receiving side first mold 8 (light-transmitting resin) that is made from the same light-transmitting resin as for the light-emitting side first mold 7. The light-emitting side first mold 7 and the light-receiving side first mold 8 are covered with the second mold 9 (first light-shielding resin) that is made from a light-shielding resin. This prevents light from directly entering the light-receiving element 3 from the light-emitting element 2.

The light-receiving element 3 can be a PSD (Position Sensitive Detector), a linear sensor with a plurality of photodiodes (PD), an image sensor, or the like. The light-receiving element 3 converts the amount of received light into an electrical signal to detect a position of a spot to which incoming reflected light converges. The light-receiving element 3 includes a signal processing section that subjects that electrical signal to predetermined computation. Alternatively, a signal processing section 12 may be provided on the leadframe 4 independently of the light-receiving element 3, as shown in FIG. 2.

The light-emitting element 2 and the light-receiving element 3 may be disposed not on the leadframe 4 but on a substrate (mounting member) having interconnections formed on its surface.

The second mold 9 has apertures 9*a* and 9*a*. The aperture 9*a* opens above the light-emitting element 2 and is formed in bowl shape having a step in the middle. On the other hand, the aperture 9*b* opens above the light-receiving element 3 and is formed in bowl shape having a step in the middle. On an upper end of the second mold 9, the light-emitting lens 5 and the light-receiving lens 6 are disposed over the apertures 9*a* and 9*b*, respectively. The aperture 9*a* forms an interior space which allows light emitted from the light-emitting element 2 to reach the light-emitting lens 5. The aperture 9*b* forms an interior space which allows light reflected by the object subject to distance measurement incident from the light-receiving lens 6 to reach the light-receiving element 3.

The light-emitting lens 5, which is made from a light-transmitting resin having a light-transmitting property, converts light emitted from the light-emitting element 2 into parallel light beams for application to the object subject to distance measurement. The light-receiving lens 6, which is made from a light-transmitting resin having a light-transmitting property, causes light reflected by the object subject to distance measurement to converge onto a light-receiving surface of the light-receiving element 3. The light-emitting lens 5 and the light-receiving lens 6 are retained by the lens frame 11. The lens frame 11 is disposed at a given position on the second mold 9, so that the light-emitting lens 5 and the light-receiving lens 6 are disposed over the apertures 9*a* and 9*b*, respectively. Further, the light-transmitting resin making up the light-emitting lens 5 and the light-receiving lens 6 can be a publicly-known light-transmitting resin (e.g. epoxy resin) commonly used to form lenses.

The light-transmitting resins as materials for the light-emitting lens 5 and the light-receiving lens 6 may be identical with each other, or may be different from each other.

The third mold 10 (second light-shielding resin member), which is made from a light-shielding resin, is formed so as to cover an outer periphery surface of the second mold 9 and an upper end surface of the lens frame 11 and to have apertures 10*a* and 10*b* through which the light-emitting lens 5 and the light-receiving lens 6 are exposed. With this arrangement, the third mold 10 retains the second mold 9 and the lens frame 11.

The second mold 9 and the third mold 10 are formed by injection molding. Further, light-shielding resins as materials for the second mold 9 and the third mold 10 can be publicly-known light-shielding resins. Such resins to be used suitably are, for example, polyphthalamide and polyphenylene sulfide (PPS), and liquid crystal polymer (LCP, thermal expansion coefficient of 5E-5). Thus, the second mold 9 and the third mold 10 made from the light-shielding resins have thermal expansion coefficients higher than that of the lens frame 11, which is made from metal as described below.

The lens frame 11 is formed from metal in a rectangular, flat-plate shape. The lens frame 11 has retaining holes for retaining the light-emitting lens 5 and the light-receiving lens 6. A suitable metallic material for the lens frame 11 is, but is not limited to, 42 alloy (thermal expansion coefficient of 5.5E-6), for example.

Figure 7:
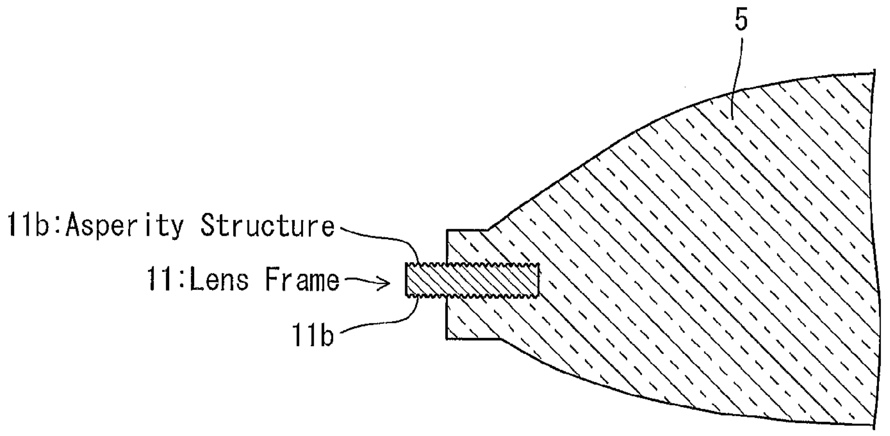
FIG. 7 is a cross-sectional enlarged view showing a retaining structure of the lens frame for the light-emitting lens in the optical distance-measuring device according to First Embodiment.

FIG. 7 is a cross-sectional view showing an enlarged retaining structure of the lens frame 11 for the light-emitting lens 5.

In FIG. 7, a retaining structure for the light-receiving lens 6 is not shown. However, as a matter of course, the light-receiving lens 6 is retained by the lens frame 11 with the same retaining structure.

As shown in FIG. 7, the lens frame 11 has a fine asperity structure 11*b* formed on its front surface and/or back surface in at least an area where the light-emitting lens is formed. The asperity structure 11*b* is formed by pearskin finishing, for example. However, the asperity structure 11*b* may be formed by any other surface finishing as long as the same effect is achieved by the surface finishing. For example, the asperity structure 11*b* can also be formed by die pressing, blast finishing, and laser processing. Apart from these methods, the asperity structure 11*b* can be formed by plating processing. By plating preprocessing, the microscopic asperity structure 11*b* in several micrometers thick can be formed on the front surface and/or back surface of the lens frame 11.

The lens frame 11 formed with the asperity structure 11*b* as described above enhances its adhesiveness to the light-transmitting resin making up the light-emitting lens 5 and the light-receiving lens 6. This can make it harder for the light-emitting lens 5 and the light-receiving lens 6 to slide at the interfaces between the light-emitting lens 5 and the lens frame 11 an between the light-receiving lens 6 and the lens frame 11.

Lens frames of the embodiments described later may be formed with the same asperity structure as the asperity structure 11*b*.

[Effect of Preventing Sliding of the Light-Emitting Lens and the Light-Receiving Lens]

The following will describe thermal expansion or contraction of the optical distance measuring device 1 when the optical distance measuring device 1 is placed in an atmosphere at high temperatures or in an atmosphere at low temperatures during reflow or the like process.

While run through a reflow furnace, the optical distance-measuring device 1 is exposed to high temperatures of not less than 260° C., as described previously. In this case, the resins forming the light-emitting lens 5, the light-receiving lens 6, the light-emitting side first mold 7, the light-receiving side first mold 8, the second mold 9, and the third mold 10 expand according to their thermal expansion coefficients. At the same time, the leadframe 4 and the lens frame 11, both of which are made from metal, also expand according to their thermal expansion coefficients by an amount smaller than the amounts of expansion of the above-described resins. At this time, sliding of the light-emitting lens 5 and the light-receiving lens 6 over the lens frame 11 occurs particularly due to difference in thermal expansion coefficient between the resin making up the light-emitting lens 5 and the light-receiving lens 6 and the metal making up the lens frame 11. Further, while taken out of the reflow furnace, the optical distance-measuring device 1 is rapidly cooled down to temperatures near room temperature. This causes rapid contraction of the optical distance-measuring device 1. Also at this time, sliding of the light-emitting lens 5 and the light-receiving lens 6 over the lens frame 11 occurs due to a difference in amount of contraction between them.

However, in the above configuration, the lens frame 11 has the asperity structure 11*b* formed on its front surface and/or back surface. This greatly enhances adhesiveness between the light-emitting lens 5 and the lens frame 11 and adhesiveness between the light-receiving lens 6 and the lens frame 11. Therefore, it is possible to prevent sliding of the light-emitting lens 5 and the light-receiving lens 6 over the lens frame 11.

Further, if plating is applied to the lens frame 11, Au—Pd plating that increases adhesiveness to a resin can be adopted. This further greatly enhances adhesiveness between the light-emitting lens 5 and the lens frame 11 and adhesiveness between the light-receiving lens 6 and the lens frame 11.

With this configuration, it is possible to keep the light-emitting element 2 and the light-receiving element 3 in relative position to the light-emitting lens 5 and the light-receiving lens 6. Thus, it is possible to facilitate the achievement of high heat resistance and high accuracy of the optical distance-measuring device 1.

[Manufacture of the Optical Distance-Measuring Device]

The following will describe procedural steps of the manufacture (manufacturing method) of the optical distance-measuring device 1.

This section will describe a case where the front and back surfaces of the lens frame 11 are subjected to plating processing to form the aforementioned asperity structure 11*b*.

First, the light-emitting element 2 and the light-receiving element 3 are placed on the leadframe 4. In this state, by using Au wires, electrical connections are made between the light-emitting element 2 and the terminals 4*b* and between the light-receiving element 3 and the terminals 4*b*.

Next, the light-emitting side first mold 7 is formed by sealing the light-emitting element 2 with the light-transmitting resin. At the same time, the light-receiving side first mold 8 is formed by sealing the light-receiving element 3 with the light-transmitting resin.

Separately from the above step, the lens frame 11 is subjected to plating processing so that a plating layer 11*a* with asperities in several micrometers thick is formed on the front and back surfaces of the lens frame 11. Further, with respect to the lens frame 11 with the plating layer 11*a* formed thereon, the light-emitting lens 5 and the light-receiving lens 6 are formed from the light-transmitting resin. In this state, solidification of the light-transmitting resin generates internal stresses between the light-emitting lens 5 and the lens frame 11 and between the light-receiving lens 6 and the lens frame 11. In view of this, before the lens frame 11 with the light-emitting lens 5 and the light-receiving lens 6 formed thereto is assembled with the third mold 10 into the optical distance-measuring device 1, the lens frame 11 is subjected to heat treatment that is equivalent to reflow. This causes thermal expansion of the light-emitting lens 5 and the light-receiving lens 6. This allows the internal stresses remaining between the light-emitting lens 5 and the lens frame 11 and between the light-receiving lens 6 and the lens frame 11 to be released before the following reflow process is carried out.

Thereafter, the second mold 9 is formed from the light-shielding resin. Further, in a state that the lens frame 11 is placed on the second mold 9, the third mold 10 is formed from the light-shielding resin so as to seal the second mold 9 and the lens frame 11, thereby completing the optical distance-measuring device 1.

In order to mount the complete optical distance-measuring device 1 on a substrate or the like, the optical distance-measuring device 1 is run through a reflow furnace. During this process, strains are caused by heat of the reflow at the interfaces between the light-emitting lens 5 and the lens frame 11 and between the light-receiving lens 6 and the lens frame 11 because there are significant difference in thermal expansion coefficient between the light-emitting lens 5 and the lens frame 11 and between the light-receiving lens 6 and the lens frame 11. However, in this state, the above-described internal stresses are already released, and only the occurrence of the strains is suppressed by the plating layer 11*a*. This makes it possible to effectively prevent sliding of the light-emitting lens 5 and the light-receiving lens 6 over the lens frame 11.

Note that, before the reflow process, the components other than the lens frame 11 (lens-equipped lens frame) having the light-emitting lens 5 and the light-receiving lens 6 formed thereto are not subjected to heat treatment equivalent to reflow. This is for the following reason. For example, the lead frame 4 is electrically connected via an Au wire to the light-emitting element 2 and the light-receiving element 3 which are mounted thereon. Further, the lead frame 4 is sealed with the light-emitting side first mold 7 and the light-receiving side first mold 8 that are made from the light-transmitting resins. Therefore, excessive application of heat equivalent to reflow to the lead frame 4 may cause disconnection of the Au wire due to expansion of the resins and other problems that would undermine reliability of the optical distance-measuring device.

On the contrary, unlike the leadframe 4, the lens-equipped lens frame has no ICs and other parts mounted thereon. Therefore, the lens-equipped lens frame does not suffer from the above-described problem when heat is applied thereto at a temperature equivalent to (or higher than) a temperature of heat applied during reflow.

Note that the above-described heat treatment is applicable to all the Second through Fourth Embodiments which will be described later.

Second Embodiment

Figure 3A:
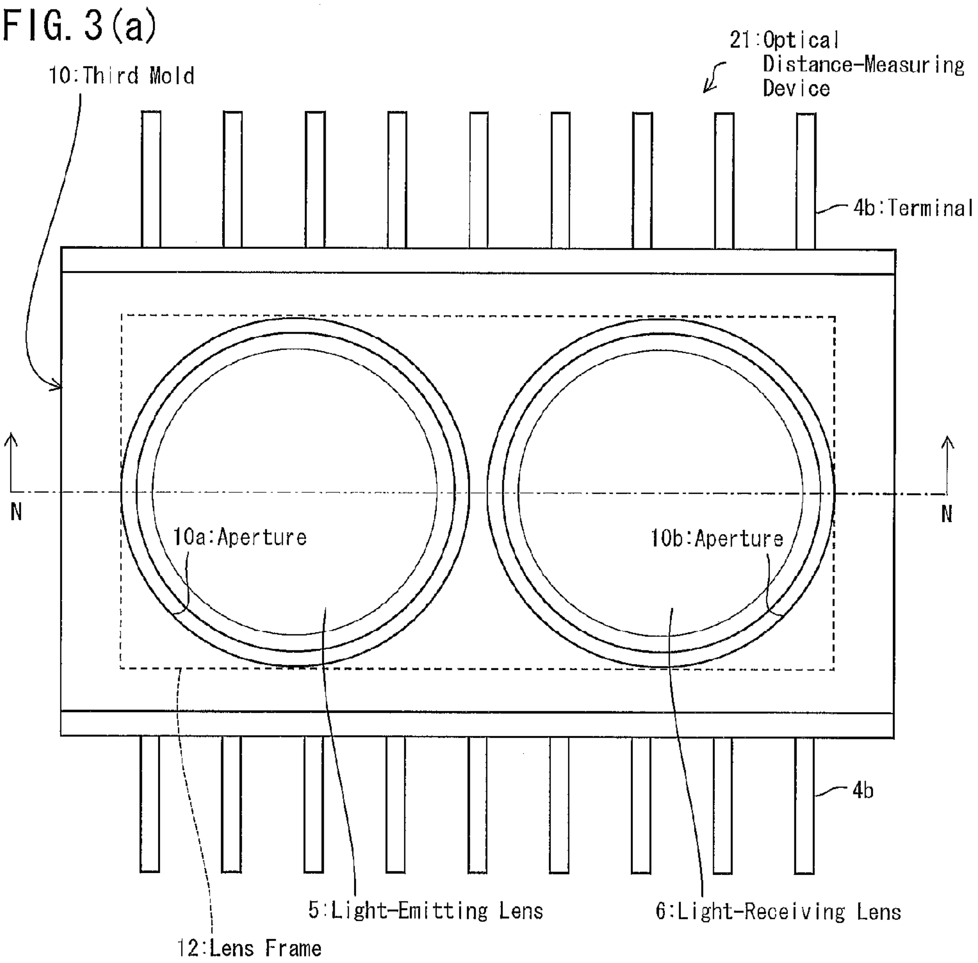
FIG. 3(*a*) is a plan view showing the configuration of an optical distance-measuring device according to Second Embodiment of the present invention.
Figure 3B:
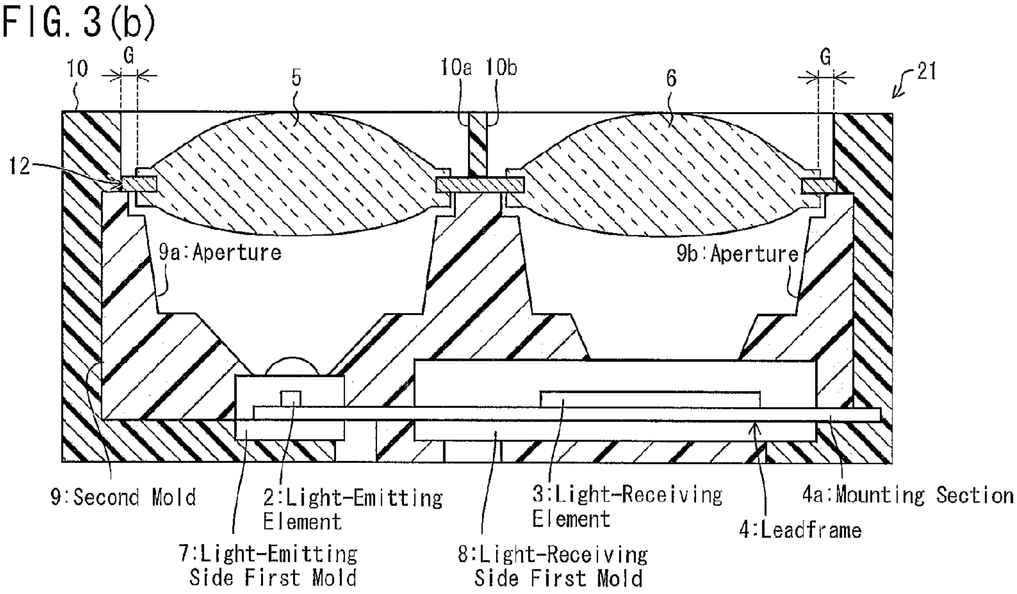

The following will describe another embodiment according to the present invention with reference to FIGS. 3(*a*), 3(*b*), and 4.

In the present embodiment, the constituent elements having the same functions as those described in the First Embodiment are given the same reference numerals and explanations thereof are omitted here.

[Configuration of the Optical Distance-Measuring Device]

Figure 4:
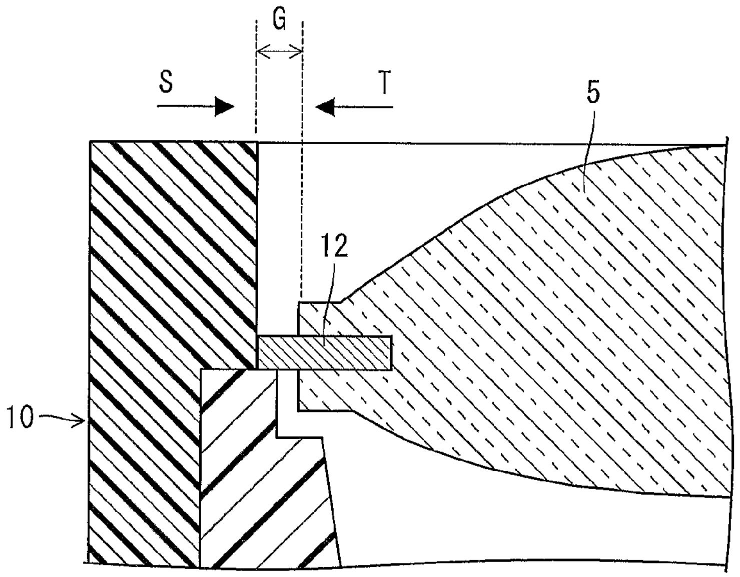
FIG. 4 is a cross-sectional enlarged view partially showing the edge of the light-emitting lens and its surrounding area in the optical distance-measuring device according to Second Embodiment.

FIGS. 3(*a*) and 3(*b*) are a plan view and a cross-sectional view, respectively, showing the configuration of an optical distance-measuring device 21 according to another embodiment of the present invention. FIG. 4 is a cross-sectional enlarged view partially showing the edge of the light-emitting lens 5 and its surrounding area in the optical distance-measuring device 21.

As shown in FIGS. 3(*a*) and 3(*b*), the optical distance-measuring device 21, as with the optical distance-measuring device 1, includes a light-emitting element 2, a light-receiving element 3, a leadframe 4, a light-emitting lens 5, a light-receiving lens 6, a light-emitting side first mold 7, a light-receiving side first mold 8, a second mold 9, and a third mold 10. In addition, the optical distance-measuring device 21 includes a lens frame 12, instead of the lens frame 11 of the optical distance-measuring device 1.

As with the lens frame 11, the lens frame 12 is formed from metal in rectangular, flat-plate shape. Further, a metallic material making up the lens frame 12 can be the aforementioned metallic material making up the lens frame 11. Unlike the lens frame 11, the lens frame 12 does not have a plating layer 11*a* on its front and back surfaces.

The apertures 10*a* and 10*b* of the third mold 10 are formed in such a manner that gaps G are formed with a given width between the aperture 10*a* and the light-emitting lens 5 and between the aperture 10*b* and the light-receiving lens 6 and that the apertures 10*a* and 10*b* have inner diameters larger than outer diameters of the light-emitting lens 5 and the light-receiving lens 6. The gap G is set to be such a distance (given width) that the light-emitting lens 5 and the light-receiving lens 6 do not come into contact with the third mold 10 when all of them are thermally expanded in such a state that the optical distance-measuring device 21 is placed in the atmosphere of high temperature of a maximum possible value in the reflow furnace.

[Effect of Preventing Sliding of the Light-Emitting Lens and the Light-Receiving Lens]

As with the optical distance-measuring device 1, while run through a reflow furnace, the optical distance-measuring device 21 is exposed to high temperatures of not less than 260° C., as described previously, during which the components expand according to their thermal expansion coefficients. In this case, the light-emitting lens 5 and the light-receiving lens 6 are caused to slide over the lens frame 12. Further, while the optical distance-measuring device 21 is taken out of the reflow furnace, the light-emitting lens 5 and the light-receiving lens 6 are caused to slide over the lens frame 12.

However, in the above configuration, the gaps G are formed in the third mold 10 between the aperture 10*a* and the light-emitting lens 5 and between the aperture 10*b* and the light-receiving lens 6. With this arrangement, as shown in FIG. 4, the third mold 10 expanded in an S direction and the light-emitting lens 5 expanded in a T direction come closer to each other within the gap G, without coming into contact with each other. In a similar manner, the light-receiving lens 6 and the third mold 10, when thermally expanded, come closer to each other within the gap G, without coming into contact with each other. Therefore, the light-emitting lens 5 and the light-receiving lens 6 do not suffer from stresses from the third mold 10 caused by contact of the third mold 10 with the light-emitting lens 5 and the light-receiving lens 6. Thus, it is possible to prevent sliding of the light-emitting lens 5 and the light-receiving lens 6 over the lens frame 12 due to stresses from the third mold 10.

With this configuration, it is possible to keep the light-emitting element 2 and the light-receiving element 3 in relative position to the light-emitting lens 5 and the light-receiving lens 6. Thus, it is possible to facilitate the achievement of high heat resistance and high accuracy of the optical distance-measuring device 21.

It should be noted that the above-described case, it is impossible to overcome the sliding occurred at the interfaces between the light-emitting lens 5 and the lens frame 12 and between the light-receiving lens 6 and the lens frame 12. Combination of the configuration according to the present embodiment with the configuration according to the First Embodiment enables further enhancement of the effect of preventing the occurrence of sliding.

Further, in the above case, the gaps G provided to avoid contacts of the third mold 10 with the light-emitting lens 5 and the light-receiving lens 6 have been described. Similar gaps may be provided between the light-emitting lens 5 and the second mold 9 and between the light-receiving lens 6 and the second mold 9. Specifically, the above-described gaps are formed between an outer edge of a lower part of the light-emitting lens 5 and the aperture 9*a* of the second mold 9 and between an outer edge of the lower part of the light-receiving lens 6 and the aperture 9*b* of the second mold 9. This also achieves the same effect as in the above case.

Third Embodiment

Figure 5A:
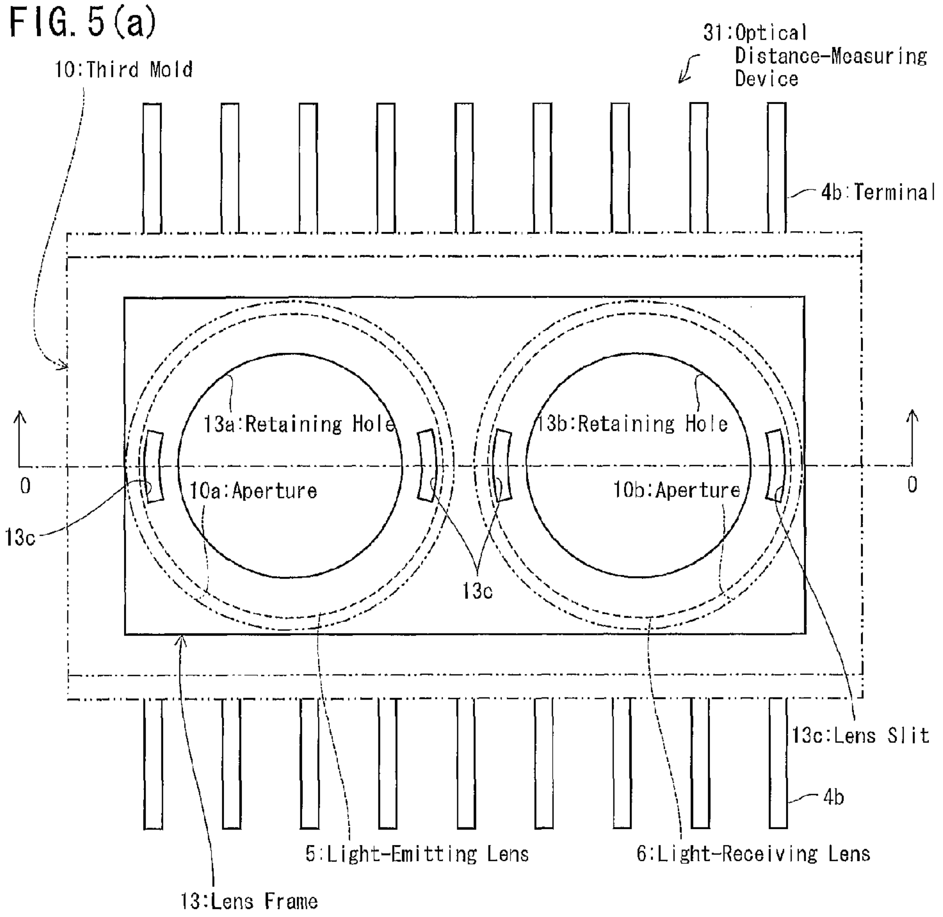
FIG. 5(*a*) is a plan view showing the configuration of an optical distance-measuring device according to Third Embodiment of the present invention.
Figure 5B:
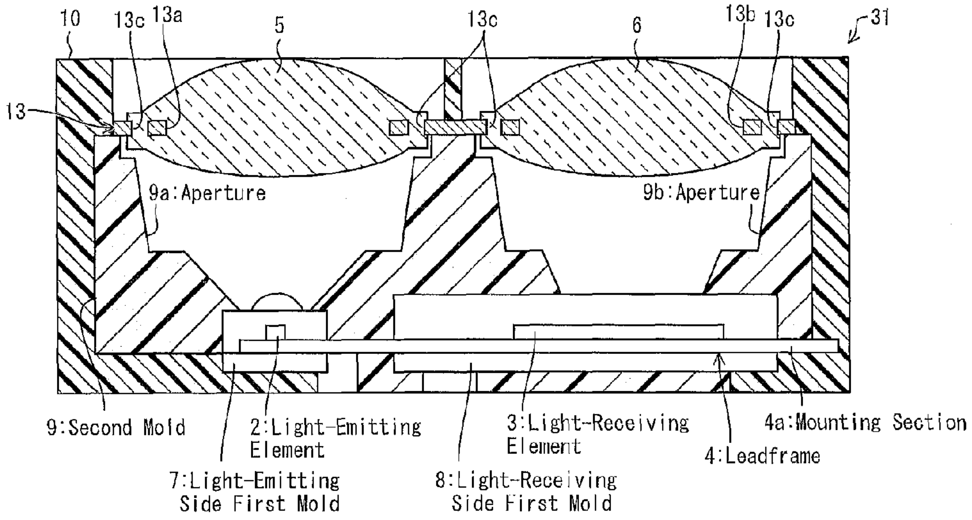

The following will describe still another embodiment of the present invention with reference to FIGS. 5(*a*), 5(*b*), 6, 18(*a*), 18(*b*), 19, and 20.

In the present embodiment, the constituent elements having the same functions as those described in the First and Second Embodiments are given the same reference numerals and explanations thereof are omitted here.

[Configuration of the Optical Distance-Measuring Device]

FIGS. 5(*a*) and 5(*b*) are a plan view and a cross-sectional view, respectively, showing the configuration of an optical distance-measuring device 31 according to still another embodiment.

As shown in FIG. 5, the optical distance-measuring device 31, as with the optical distance-measuring device 21, includes a light-emitting element 2, a light-receiving element 3, a leadframe 4, a light-emitting side first mold 7, a light-receiving side first mold 8, a second mold 9, and a third mold 10. In addition, the optical distance-measuring device 31 includes a lens frame 13, instead of the lens frame 12 of the optical distance-measuring device 21.

As with the lens frame 12, the lens frame 13 is formed from metal in rectangular, flat-plate shape. Further, a metallic material making up the lens frame 13 can be the aforementioned metallic material making up the lens frame 12.

The lens frame 13 has retaining holes 13*a* and 13*b* for retaining the light-emitting lens 5 and the light-receiving lens 6. Further, the lens frame 13 has two lens slits 13*c* (slit holes) that penetrate the lens frame 13 on opposite sides of each of the retaining holes 13*a* and 13*b* at the positions near the rim of each of the retaining holes 13*a* and 13*b*.

The light-emitting lens 5 and the light-receiving lens 6 are formed with respect to the lens frame 13 by filling the light-transmitting resin into a mold up to a broken line shown in FIG. 5(*a*). At this time, the light-transmitting resin passes through the inside of the lens slits 13*c*. With this arrangement, in a state that the light-transmitting resin is solidified, the light-emitting lens 5 and the light-receiving lens 6 have connection parts that connect the light-emitting lens 5 and the light-receiving lens 6 to the lens frame 13 through the lens slits 13*c*. This brings about a state that the connection parts are hit into the lens frame 13.

[Effect of Preventing Sliding of the Light-Emitting Lens and the Light-Receiving Lens]

As with the optical distance-measuring device 21, while run through a reflow furnace, the optical distance-measuring device 31 is exposed to high temperatures of not less than 260° C., as described previously, during which the components expand according to their thermal expansion coefficients. In this case, the light-emitting lens 5 and the light-receiving lens 6 are caused to slide over the lens frame 13. Further, while the optical distance-measuring device 31 is taken out of the reflow furnace, the light-emitting lens 5 and the light-receiving lens 6 are caused to slide over the lens frame 13.

However, in the above configuration, the light-emitting lens 5 and the light-receiving lens 6 have connection parts that connect the light-emitting lens 5 and the light-receiving lens 6 to the lens frame 13 through the lens slits 13*c* in such a manner that the connection parts are hit into the lens frame 13. With this configuration, in the light-emitting lens 5 and light-receiving lens 6, the generation of stresses parallel to the surface of the lens frame 13 at the temperature rise and drop caused by reflow is curbed by the connection parts, which are formed in a direction perpendicular to the lens slits 13*c* with respect to a direction of the stresses. This makes it possible to prevent sliding of the light-emitting lens 5 and the light-receiving lens 6.

Further, as shown in FIG. 5(*a*), the lens slits 13*c* are provided in the lens frame 13 at two opposing positions between which the retaining hole 13*a* (13*b*) is interposed. If only one lens slit 13*c* is provided, stress is scattered about the one lens slit 13*c*, depending upon the degree of stress. This may cause sliding of the light-emitting lens 5 and the light-receiving lens 6 in a direction of rotation about the one lens slit 13*c*. On the contrary, if two lens slits 13*c* are provided, stress is scattered evenly. This makes it possible to effectively prevent the occurrence of sliding in the direction of the rotation. Most preferably, as shown in FIG. 5(*a*), the lens slits 13*c* are arranged on an O-O line (a line passing through centers of the light-emitting lens 5 and the light-receiving lens 6), which lies along the direction of movement of the light-receiving spot.

The lens slits 13*c* provided for each of the light-emitting lens 5 and the light-receiving lens 6 are not limited two lens slits. Alternatively, three or more lens slits 13*c* may be provided. In this case, it is preferable that the lens slits 13*c* are arranged so as to scatter stress evenly.

Note that the present embodiment, including the following modified examples, can be applied to the aforementioned First and Second Embodiments. This makes it possible to further enhance the effect of preventing sliding of the light-emitting lens 5 and the light-receiving lens 6.

[Setting of Distance Between Slit Holes]

Figure 18A:
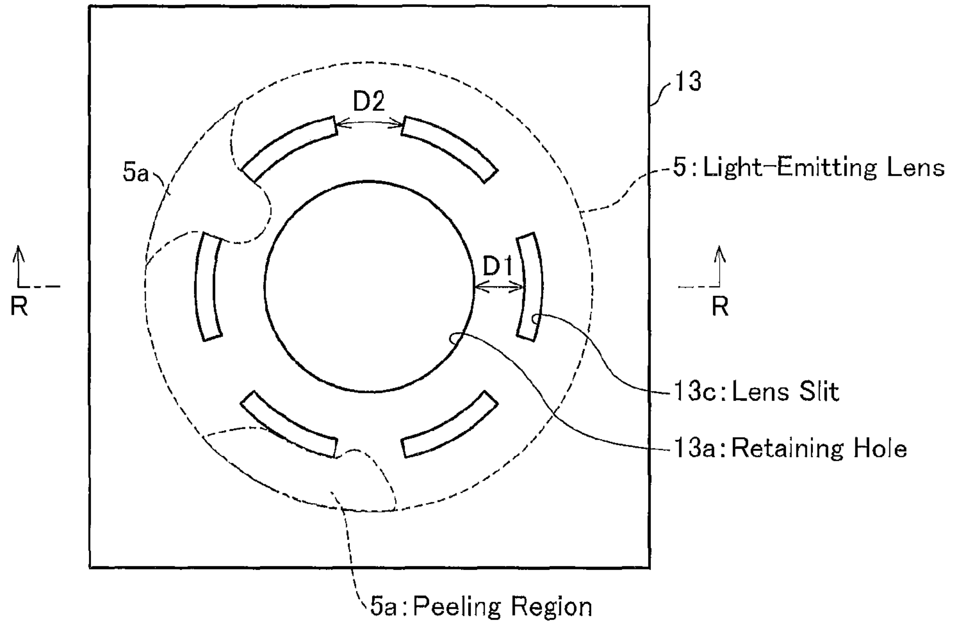
FIG. 18(*a*) is a plan view of a lens frame and a light-emitting lens in the optical distance-measuring device according to Third Embodiment for explanation of a relation between a lens slit-to-lens slit distance and a lens slit-to-retaining hole distance on the lens frame.
Figure 18B:
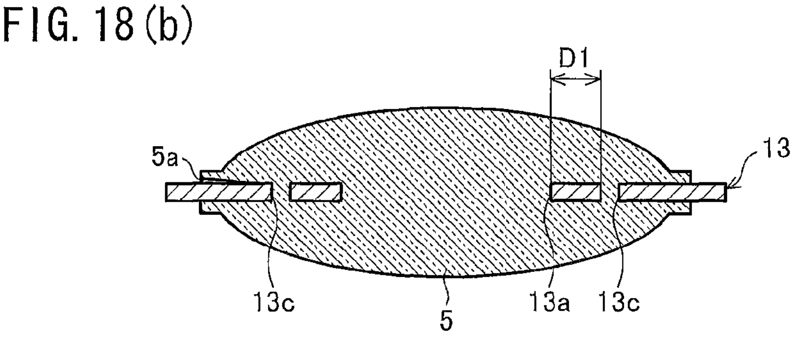
Figure 19:
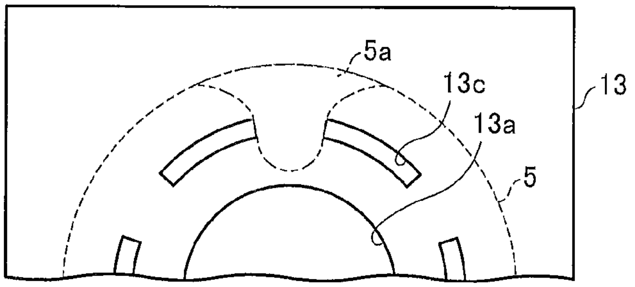
FIG. 19 is a partial plan view showing the lens frame and the light-emitting lens in such a state that peeling of the light-emitting lens is taking place in a region between the lens slits.
Figure 20:
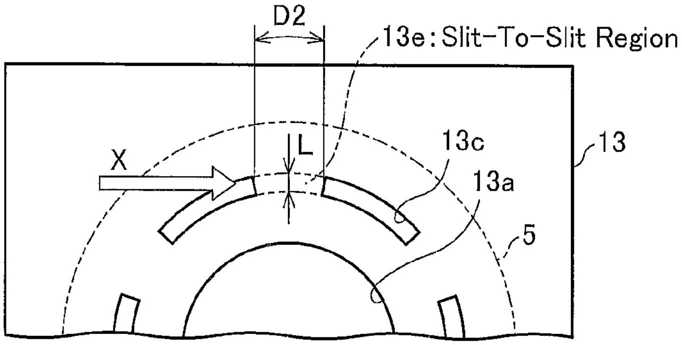
FIG. 20 is a partial plan view of the lens frame and the light-emitting lens showing that stress works in the region between the lens slits.

FIGS. 18(*a*) and 18(*b*) are a plan view and a cross-sectional view of the lens frame 13 and the light-emitting lens 5 for explanation of a relation between a distance between the lens slits 13*c* and a distance between the lens slit 13*c* and the retaining hole 13*a*. FIG. 19 is a partial plan view showing the lens frame 13 and the light-emitting lens 5 in such a state that peeling of the light-emitting lens 5 is taking place in a region between the lens slits 13*c*. FIG. 20 is a partial plan view of the lens frame 13 and the light-emitting lens 5 showing that stress works in the region between the lens slits 13*c*.

As shown in FIG. 18(*a*), the lens slits 13*c* are arranged concentrically with respect to the retaining hole 13*a* so as to lie along the perimeter of the retaining hole 13*a*. The lens slits 13*c* are preferably arranged in such a manner that a distance between the lens slit 13*c* and the retaining hole 13*a* (slit hole-to-retaining hole distance D1) is not smaller than a distance between adjacent lens slits 13*c* (slit hole-to-slit hole distance D2). The reason for this is given below.

For convenience of explanation, only the light-emitting lens 5 is depicted in FIGS. 18(*a*) and 18(*b*), 19, and 20, and the following descriptions refer only to the light-emitting lens 5. However, as a matter of course, the same goes for the light-receiving lens 6.

When the optical distance-measuring device 31 is thermally expanded or contracted, stress caused by the expansion or contraction works on the lens frame 13. If the degree of stress is more than the degree of adhesion between the light-emitting lens 5 and the lens frame 13, an outer region of the light-emitting lens 5 is peeled off at the interface where the light-emitting lens 5 is adhered to the surface of the lens frame 13, which forms a peeling region 5*a*, as shown in FIGS. 18(*a*) and 18(*b*). The peeling region 5*a* increases as the peeling advances toward the retaining hole 13*a*.

In the lens slits 13*c* filled with a lens resin, there exist no interfaces between the light-emitting lens 5 and the surface of the lens frame 13. Because of this, the advance of peeling is stopped by the lens slits 13*c*. With regard to peeling taking place in the region between the adjacent lens slits 13*c*, the nearer to the lens slits 13*c* the region is, the more the advance of the peeling is suppressed by the lens resin filled into both of the adjacent lens slits 13*c*. Therefore, as shown in FIG. 19, the peeling region 5*a* can be considered to spread from a region between the adjacent lens slits 13*c* toward the retaining hole 13*a* so as to form a circle having a diameter approximating to the slit hole-to-slit hole distance D2. Therefore, with the configuration in which the slit hole-to-retaining hole distance D1 is not smaller than the slit hole-to-slit hole distance D2, it is possible to prevent the peeling region 5*a* from spreading over the retaining hole 13*a* (interior diameter of the lens). Thus it is possible to avoid change of the relative position between the light-emitting lens 5 and the light-emitting element 2 due to stress caused by peeling.

Assume that the slit hole-to-retaining hole distance D1 is equal to the slit hole-to-slit hole distance D2. In this case, the peeling region 5*a* may reach the retaining hole 13*a* (interior diameter of the lens), but it is possible to prevent the peeling region 5*a* from spreading over the retaining hole 13*a*. Further, in this case, a positional relation between the retaining hole 13*a* and the lens slits 13*c* can be readily set by adjusting the slit hole-to-retaining hole distance D1 and the slit hole-to-slit hole distance D2. Therefore, it is possible to suitably reduce an area of the light-emitting lens 5 by adjusting the slit hole-to-slit hole distance D2 to a distance as small as possible and adjusting the slit hole-to-retaining hole distance D1 accordingly.

However, an extremely small slit hole-to-slit hole distance D2 produces insufficient strength of a region between the lens slit 13*c* and the retaining hole 13*a* in the lens frame 13. In this case, when undergoing the stress as described above, that region of the lens frame 13 can deform. In view of this, it is preferable that the slit hole-to-slit hole distance D2 is not smaller than a thickness of the lens frame 13 so that the lens frame 13 has a strength to such an extent that it can avoid such deformation. The reason for this is given below.

As shown in FIG. 20, a slit-to-slit region 13*e* is formed between the adjacent lens slits 13*c*. If the slit hole-to-slit hole distance D2 is not smaller than the thickness of the lens frame 13, the slit-to-slit region 13*e* has strength of such a degree that it can resist stresses working not only in an X direction (direction orthogonal to a direction of a diameter of the light-emitting lens 5) but also in a direction of the thickness of the lens frame 13. On the contrary, if the slit hole-to-slit hole distance D2 is smaller than the thickness of the lens frame 13, strength of the slit-to-slit region 13*e* decreases to such a degree that it cannot resist stress working in the X direction. As a result, the slit-to-slit region 13*e* deforms to such an extent that the slit hole-to-slit hole distance D2 becomes smaller. Accordingly, the region between the lens slit 13*c* and the retaining hole 13*a* also deforms.

The factors that determine the strength of the slit-to-slit region 13*e* against the stress working in the X direction include a length L (width of the lens slit 13*c*) in the direction of the diameter of the light-emitting lens 5. However, the slit hole-to-slit hole distance D2 has greater influence on the strength than the length L.

Here, the lens slit 13*c* is provided for the effect of suppressing peeling of the light-emitting lens 5. Therefore, it is essential only that the lens slit 13*c* has a minimum size required to achieve such an effect. However, increase of the lens slit 13*c* requires settings the slit hole-to-retaining hole distance D1 and the slit hole-to-slit hole distance D2 to values that satisfy the aforementioned conditions, in order that the advance of peeling over the retaining hole 13*a* and decrease of the above-described strength are not incurred. This requires increase of the size of the entire lens frame 13. Accordingly, the size of the optical distance-measuring device 31 needs to be increased. Therefore, from the viewpoint of avoiding upsizing of the optical distance-measuring device 31, it is preferable that the lens slit 13*c* is formed so as to be as small as possible within the bounds of enabling flowing of the lens resin into the lens slit 13*c* and satisfying the aforementioned conditions for the slit hole-to-retaining hole distance D1 and the slit hole-to-slit hole distance D2.

As described above, it is preferable that the slit hole-to-retaining hole distance D1 and the slit hole-to-slit hole distance D2 of the lens frame 13 are set properly. This make it possible to suppress peeling of the light-emitting lens 5 and the light-receiving lens 6 and to enhance the strength of the lens frame 13 against thermal stress, without incurring the upsizing of the lens frame 13.

Modified Example

Figure 6:
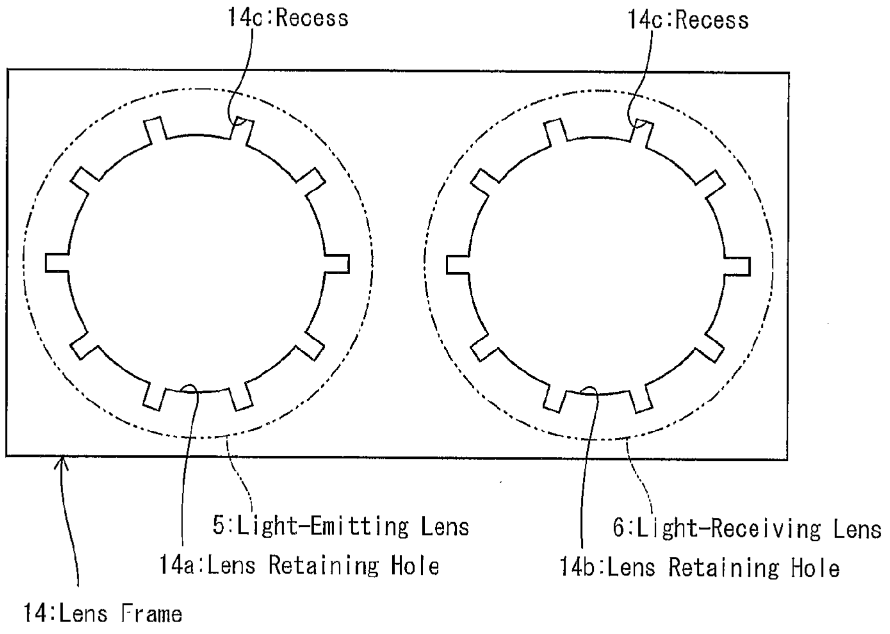
FIG. 6 is a plan view showing, as a modified example of Third Embodiment, the configuration of a lens frame having the lenses formed thereto.

The following will describe one modified example of the present embodiment. FIG. 6 is a plan view showing the configuration of the lens frame 14 in the optical distance-measuring device 31 according to the modified example of the present embodiment.

In the present modified example, the lens frame 13 is replaced by a lens frame 14.

The lens frame 14 has retaining holes 14*a* and 14*b* for retaining the light-emitting lens 5 and the light-receiving lens 6, respectively. Further, each of the retaining holes 14*a* and 14*b* of the lens frame 14 has a plurality of recesses 14*c* at a given spacing. Each of the retaining holes 14*a* and 14*b* with the recesses 14*c* is shaped like a gear.

With the use of the lens frame 14, the light-transmitting resin passes through the inside of the recesses 14*c* at the time of forming the light-emitting lens 5 and the light-receiving lens 6. This enhances a connection between the light-transmitting resin and the lens frame 14. With this arrangement, the gear-shaped structure of the retaining holes 14*a* and 14*b* can counter the stresses generated at the reflow and working in parallel to the surface of the lens frame 14. Therefore, it is possible to prevent sliding of the light-emitting lens 5 and the light-receiving lens 6.

Further, the lens frame 14 has the gear-shaped structure of the retaining holes 14*a* and 14*b*. With this arrangement, the connections between the light-emitting lens 5 and the lens frame 14 and between the light-receiving lens 6 and the lens frame 14 can be enhanced with a design more compact than the lens slits 13*c* that require a relatively large space. Therefore, the lens frame 14 has an advantage over the lens frame 13 from the viewpoint of downsizing.

Fourth Embodiment

Figure 8:
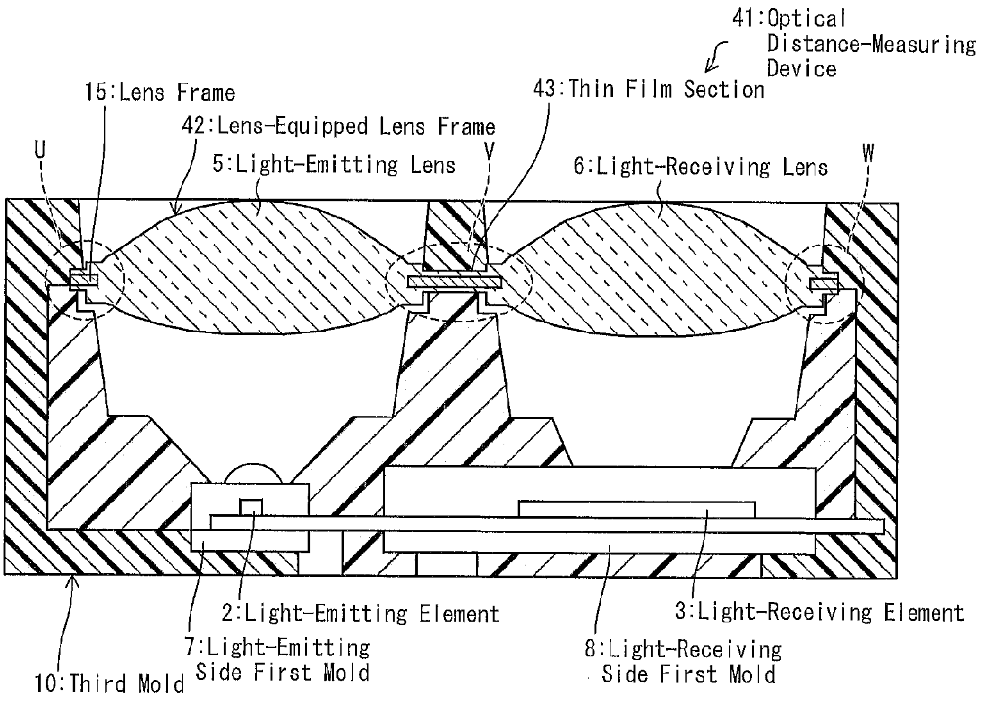
FIG. 8 is a cross-sectional view showing the configuration of an optical distance-measuring device according to Fourth Embodiment of the present invention.
Figure 9A:
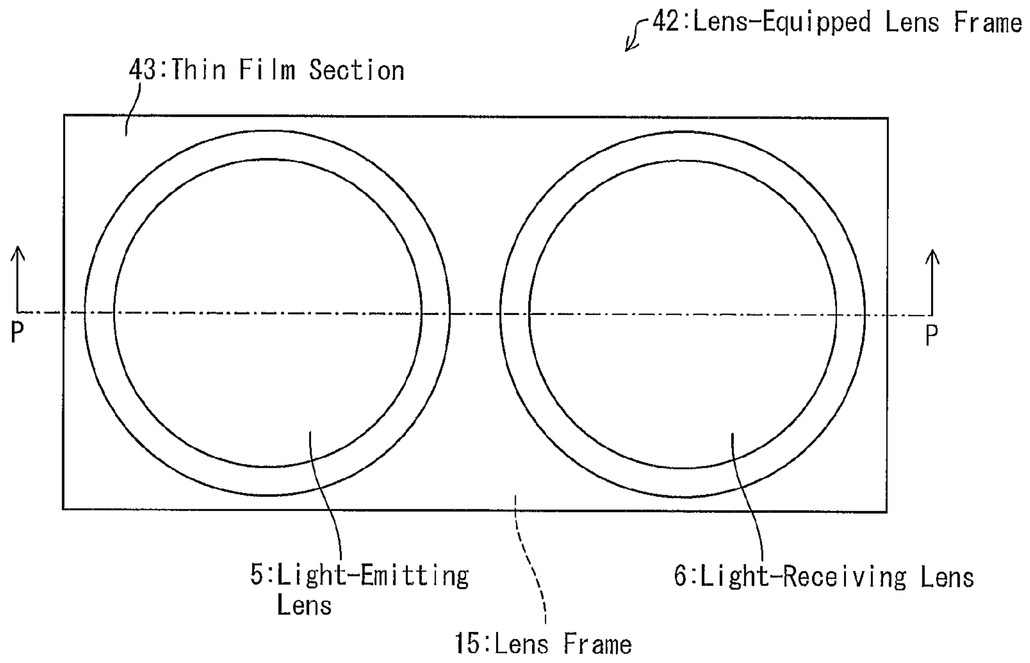
FIG. 9(*a*) is a plan view showing the configuration of a lens-equipped lens frame in the optical distance-measuring device shown in FIG. 8.
Figure 9B:
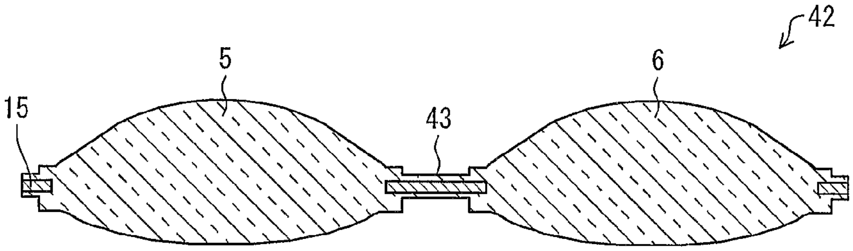

The following will describe yet another embodiment according to the present invention with reference to FIGS. 8, 9(*a*), and 9(*b*).

In the present embodiment, the constituent elements having the same functions as those described in the First Embodiments are given the same reference numerals and explanations thereof are omitted here.

[Configuration of the Optical Distance-Measuring Device]

FIG. 8 is a cross-sectional view showing the configuration of an optical distance-measuring device 41 according to yet another embodiment. FIGS. 9(*a*) and 9(*b*) are a plan view and a cross-sectional view, respectively, showing the configuration of a lens-equipped lens frame 42 in the optical distance-measuring device 41.

As shown in FIG. 8, the optical distance-measuring device 41, as with the optical distance-measuring device 1, includes a light-emitting element 2, a light-receiving element 3, a leadframe 4, a light-emitting side first mold 7, a light-receiving side first mold 8, a second mold 9, and a third mold 10. In addition, the optical distance-measuring device 41 includes a lens-equipped lens frame 42.

As shown in FIGS. 9(*a*) and 9(*b*), the lens-equipped lens frame 42 has a thin film section 43. The thin film section 43 is formed on front and back surfaces of a lens frame 15 in areas other than areas where the light-emitting lens 5 and the light-receiving lens 6 are attached to the lens frame 15. Also, the thin film section 43 is integrally formed from the same light-transmitting resin as those for the light-emitting lens 5 and the light-receiving lens 6.

In the optical distance-measuring device 41 configured as described above, the lens frame 15 of the lens-equipped lens frame 42 is coated with the thin film section 43. This avoids the lens frame 15 from coming into contact with the second mold 9 and the third mold 10. With this arrangement, there occur resin-to-resin contacts of the lens-equipped lens frame 42, the second mold 9, and the third mold 10 in a letter-U section, a letter-V section, and a letter-W section all shown by broken lines in FIG. 8. This enhances adhesiveness. Therefore, it is possible to further reduce the occurrence of sliding, as compared with the configuration where the lens frame 11 comes into contact with the second mold 9 and the third mold 10.

For example, the occurrence of sliding between the third mold 10 and the light-emitting lens 5 in the letter-U section which is an outer edge of the third mold 10 requires the occurrence of sliding in the letter-V section which is a center part of the third mold 10 and the occurrence of sliding in the letter-W section which is an opposing outer edge of the third mold 10. This means that no sliding occurs unless enormous stress works. Thus, a great effect of preventing the occurrence of sliding can be expected.

Note that the thin film section 43 formed on the lower surface side of the lens frame 15 in the letter-V section, depending upon its thickness, can be a direct light-guiding path of light emitted from the light-emitting element 2 to the light-receiving element 3 side. Therefore, with regard to the thin film section 43, it is preferable that the thin film section 43 is designed to be thin enough to prevent the entry of light and that the thin film section 43 takes a thin-film structure like a maze of light inside the thin film section 43.

Further, in the above configuration, the thin film section 43 is integrally formed from the resin that is identical with the resin used to form the light-emitting lens 5 and the light-receiving lens 6. With this arrangement, it is possible to form the thin film section 43 simultaneously with the formation of the light-emitting lens 5 and the light-receiving lens 6 on the lens frame 15. Therefore, it is possible to readily form the thin film section 43.

Fifth Embodiment

Figure 10:
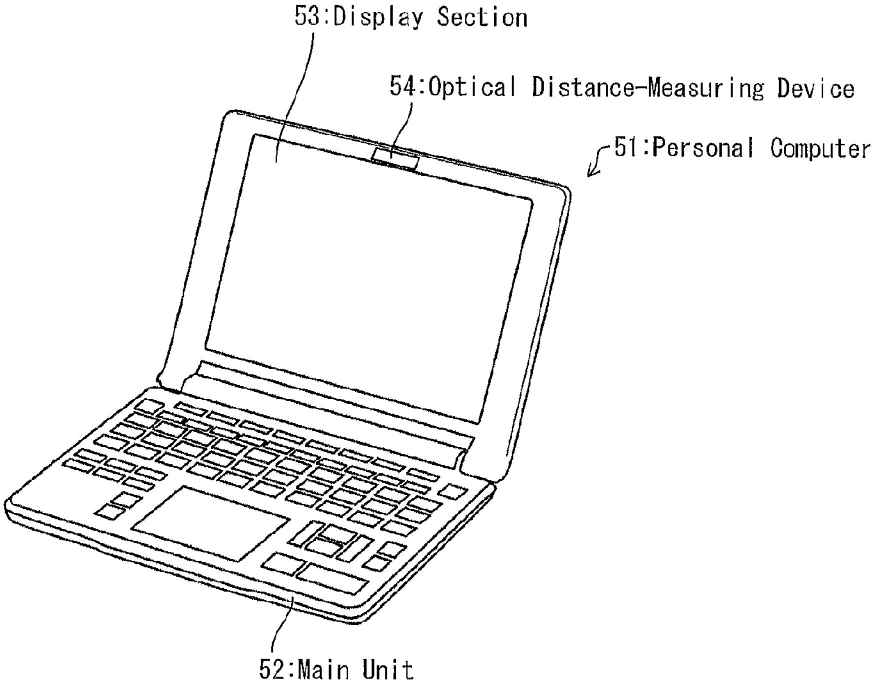
FIG. 10 is a perspective view showing the configuration of a personal computer according to Fifth Embodiment of the present invention.

The following will describe still another embodiment according to the present invention with reference to FIG. 10.

FIG. 10 is a perspective view showing a personal computer 51 as an electronic device.

As shown in FIG. 10, the personal computer 51 has a main unit 52 and a display section 53. At an upper part of a rim of the display section 53, an optical distance-measuring device 54 is provided. As the optical distance-measuring device 54 used is any one of the aforementioned optical distance-measuring devices 1, 21, 31, and 41 with high heat resistance and high performance.

The personal computer 51 is able to accurately detect the presence or absence of a person in front of the personal computer by means of the optical distance-measuring device 54. This allows the personal computer 51 to change its operation mode to a sleep mode when the person goes away from the front of the personal computer 51, thus efficiently saving energy.

Further, the optical distance-measuring device 54, which is a high-performance device with high heat resistance, can be readily mounted in large quantities on substrates in a short time through reflow.

An electronic device which can be equipped with the optical distance-measuring device 54 is not limited to the personal computer 51. For example, the optical distance-measuring device 54 can be used for non-contact operation. Specifically, for home electric appliances used in a kitchen and sanitary apparatuses, the optical distance-measuring device 54 can be used as a non-contact switch with which their operations are switched on and off without contact therewith. In addition, the optical distance-measuring device 54 can be used for operations of electronic devices, e.g. detecting a distance to user's hands to perform volume control when the user's hands are wet or dirty.

Comparative Example

Figure 11A:
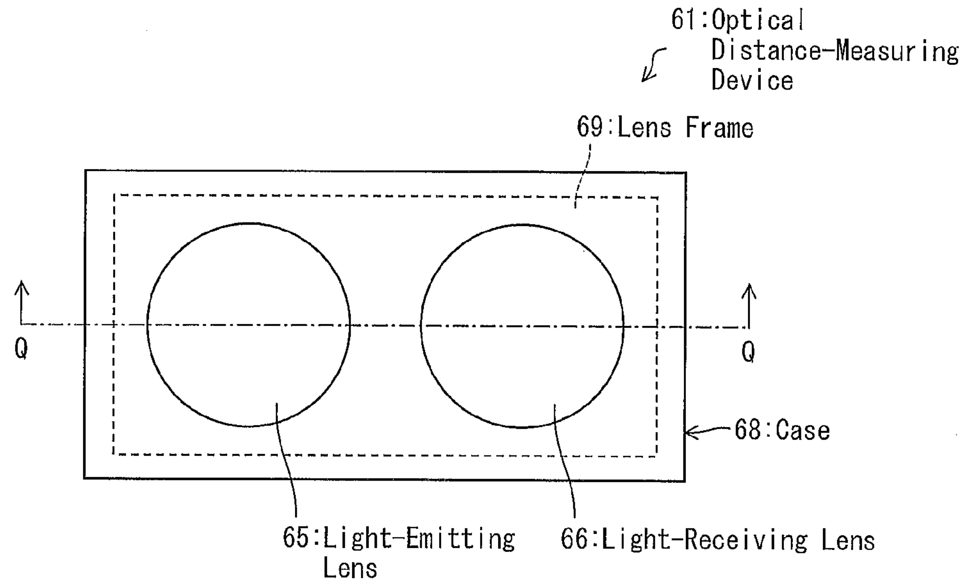
FIG. 11(*a*) is a plan view showing the configuration of an optical distance-measuring device according to Comparative Example of the embodiments of the present invention.
Figure 11B:
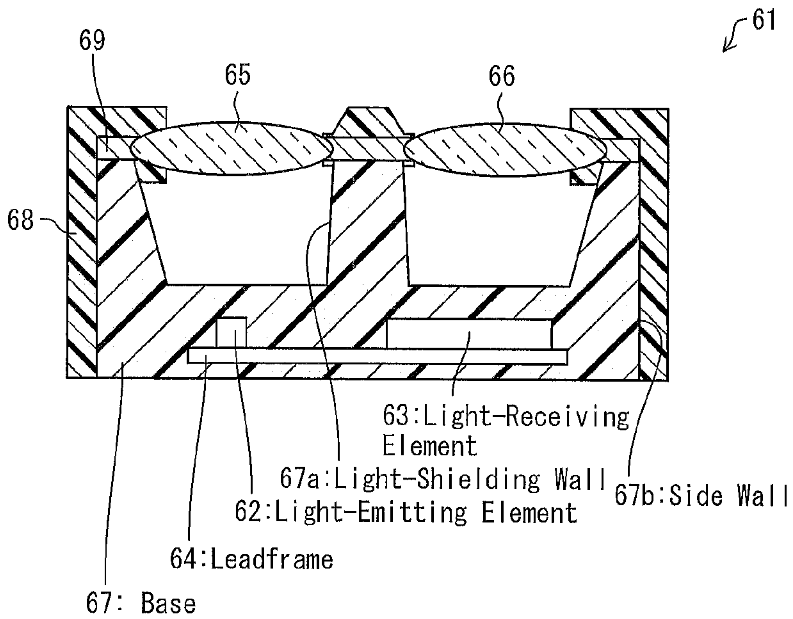
Figure 12:
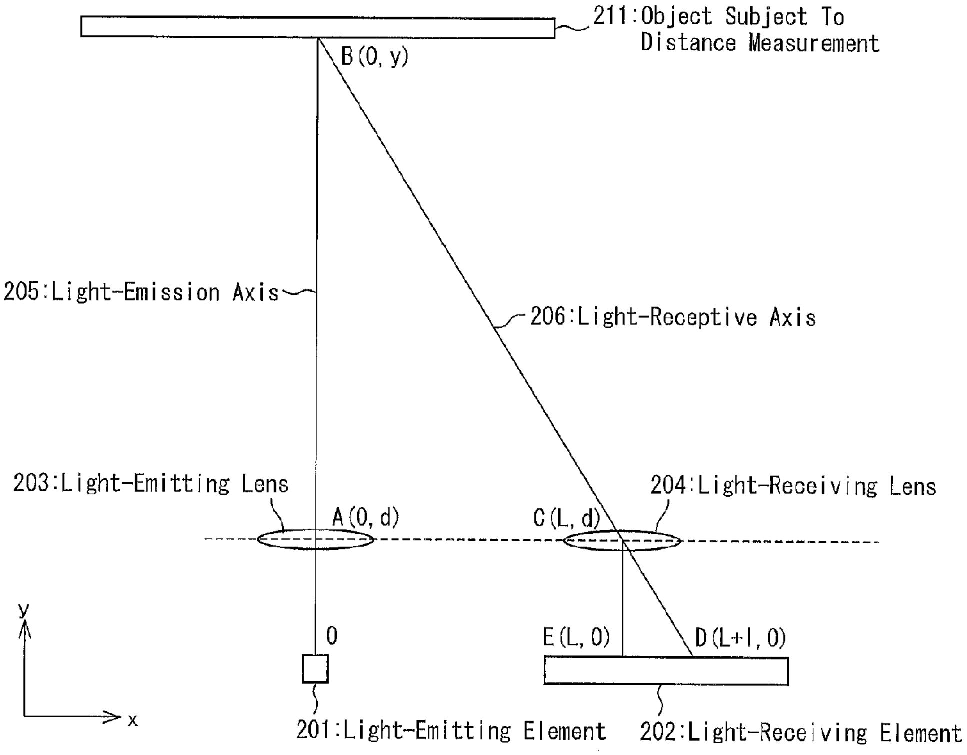
FIG. 12 is an explanatory view of the principle of a typical triangulation method.
Figure 13:
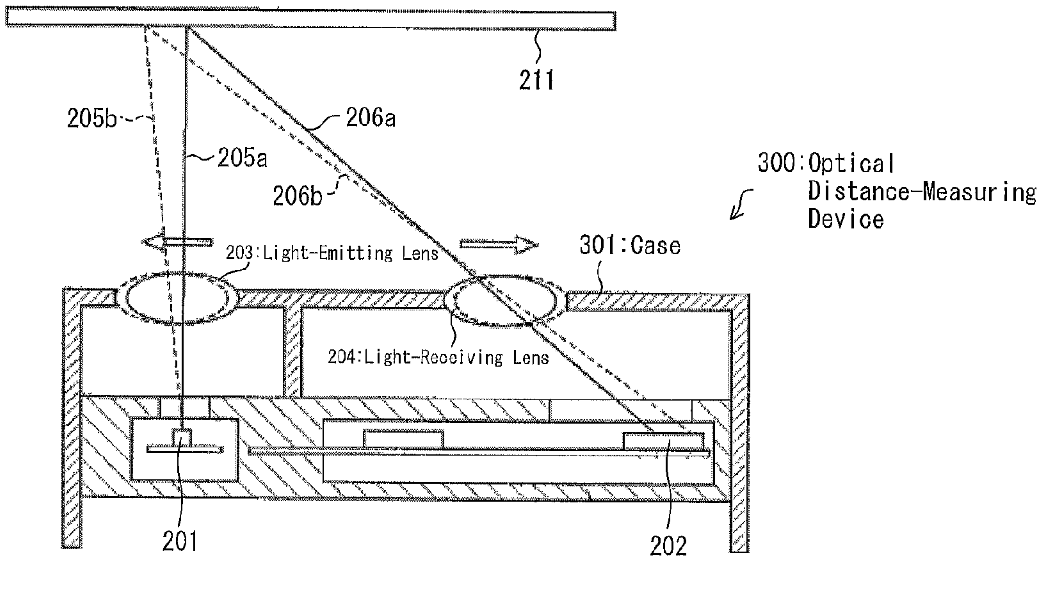
FIG. 13 is a cross-sectional view showing the configuration of a typical distance-measuring device.
Figure 14:
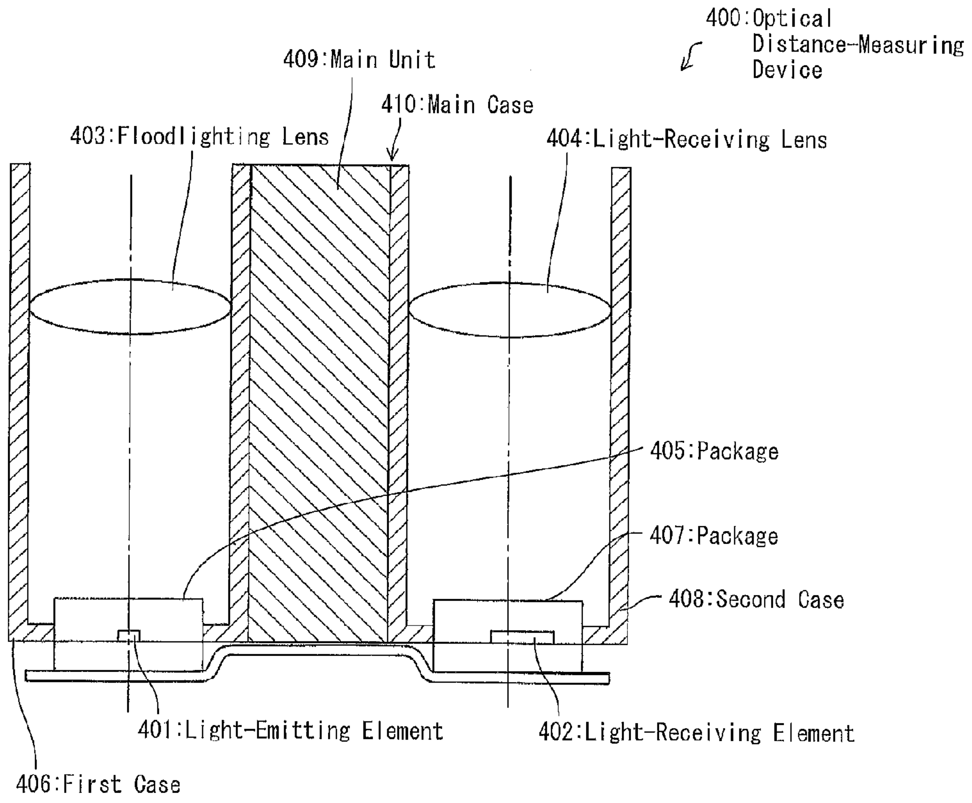
FIG. 14 is a cross-sectional view showing the configuration of a distance-measuring device described in Patent Literature 1.
Figure 15:
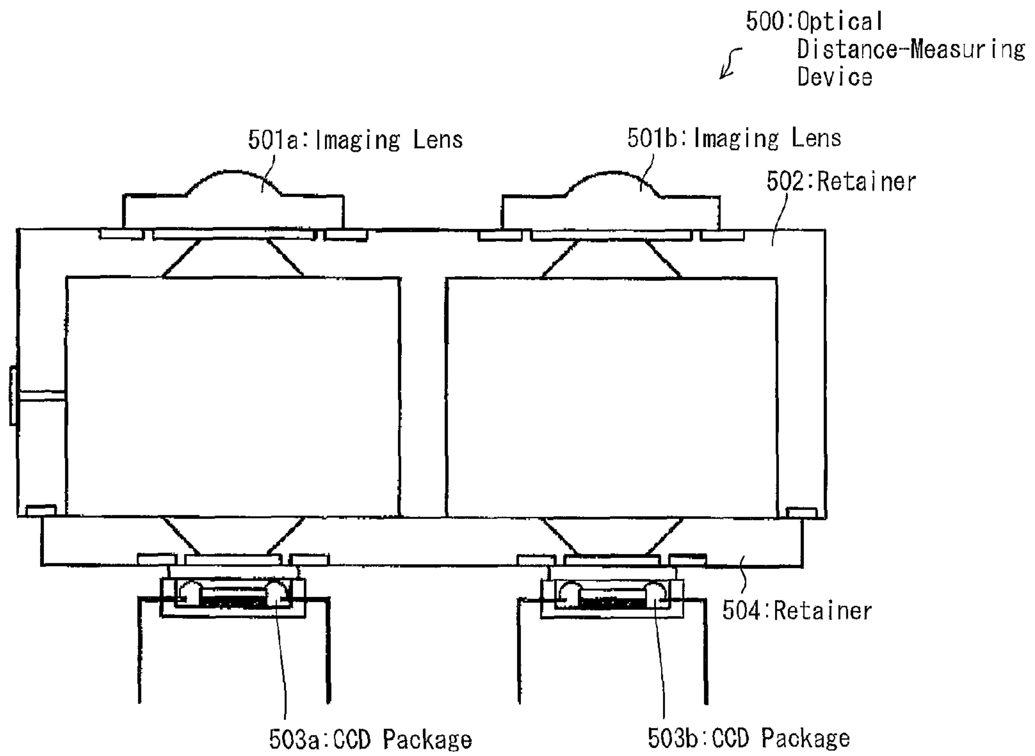
FIG. 15 is a cross-sectional view showing the configuration of a distance-measuring device described in Patent Literature 2.
Figure 16:
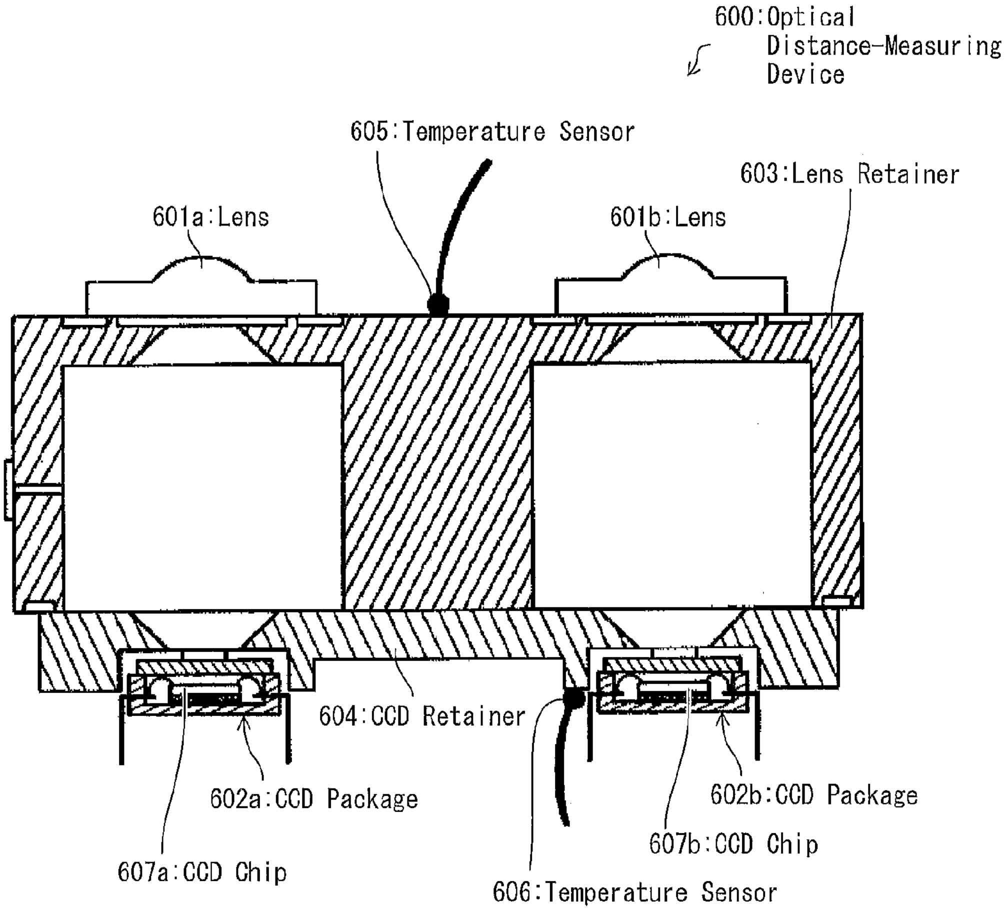
FIG. 16 is a cross-sectional view showing the configuration of a distance-measuring device described in Patent Literature 3.
Figure 17:
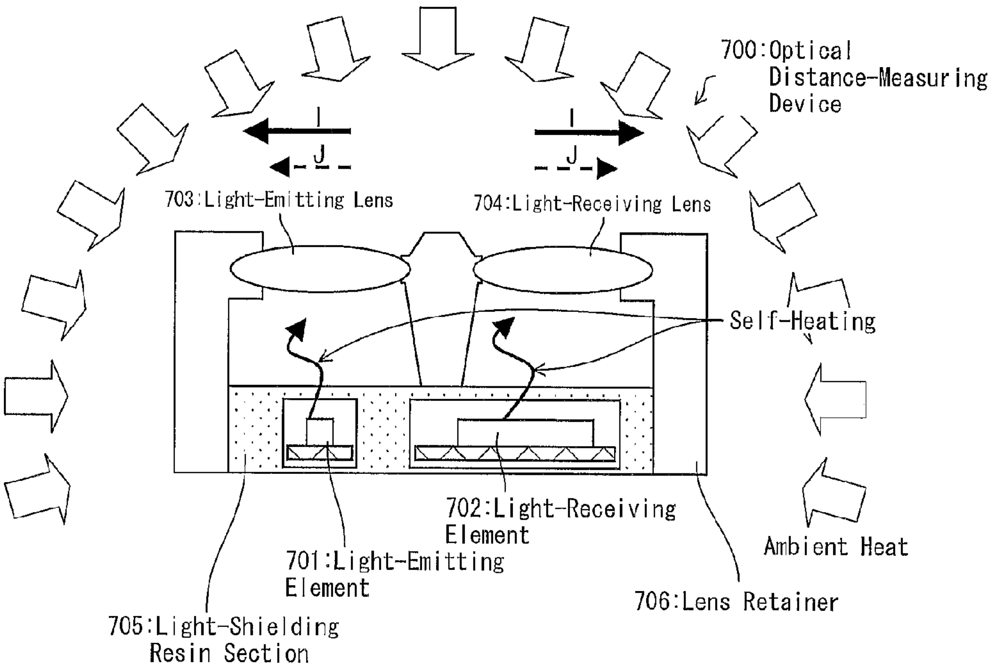
FIG. 17 is an explanatory view showing variations of the amount of change in distance between lenses due to ambient heat and self-heating in a distance-measuring device.

The following will describe a comparative example of the present invention with reference to FIGS. 11(*a*) and 11(*b*).

FIGS. 11(*a*) and 11(*b*) are a plan view and a cross-sectional view showing the configuration of an optical distance-measuring device 61 according to the present comparative example.

As shown in FIGS. 11(*a*) and 11(*b*), the optical distance-measuring device 61 includes, a light-emitting element 62, a light-receiving element 63, a leadframe 64, a light-emitting lens 65, a light-receiving lens 66, a base 67, a case 68, and a lens frame 69.

The light-emitting element 62 and the light-receiving element 63 formed on the leadframe 64 are sealed with the base 67 composed of a light-shielding resin. The base 67 has light-shielding walls 67*a* and side walls 67*b*. The light-shielding walls 67*a* shield light emitted from the light-emitting element 62 and light incident onto the light-receiving element 63. The side walls 67*b* are formed on lateral sides of the base 67. Further, the case 68 composed of a light-shielding resin is formed so as to cover the side walls 67*b* therewith.

The lens frame 69 is formed from metal in flat-plate shape and retains the light-emitting lens 65 and the light-receiving lens 66. The lens frame 69 is retained so as to be interposed between the base 67 and the case 68.

In the optical distance-measuring device 61 with the configuration as described above, the lens frame 69 is formed from metal having a thermal expansion coefficient lower than that of the light-shielding resin used to form the base 67 and case 68. With this configuration, even when the base 67 and the case 68 are thermally expanded due to ambient heat or self-heating of the light-emitting element 62 and the light-receiving element 63, the lens frame 69 hardly expands.

Therefore, there is little difference between the amount of change in distance between the light-emitting lens 65 and the light-receiving lens 66 due to ambient heat and the amount of change in distance between the light-emitting lens 65 and the light-receiving lens 66 due to self-heating. Thus, unlike the optical distance-measuring device 600, the optical distance-measuring device 61 can prevent decreased distance measurement accuracy while eliminating difference between the amount of change in distance between the lenses due to ambient heat and the amount of change in distance between the lenses due to self-heating.

However, in case where the optical distance-measuring device 61 is subjected to reflow soldering, its ambient temperature rises to the order of 260° C. for a short time. This causes great expansion of resins making up the light-emitting lens 65, the light-receiving lens 6, the base 67, and the case 68. On the contrary, metals making up the leadframe 64 and the lens frame 69 hardly expand because the metals have thermal expansion coefficients lower than those of the resins.

Thus, great stress resulting from difference in thermal expansion coefficient generates at the interface between the light-emitting lens 65 and the lens frame 69 and at the interface between the light-receiving lens 66 and the lens frame 69. This results in sliding of the light-emitting lens 65 and the light-receiving lens 66 over the lens frame 69. The occurrence of such sliding, when the ambient temperature returns to room temperature after reflow, cause changes in relative positional relation between the light-emitting lens 65 and the light-emitting element 62 and in relative positional relation between the light-receiving lens 66 and the light-receiving element 63 as compared to original positional relations obtained before the optical distance-measuring device 61 is subjected to reflow. This changes the position of the reflected light spot obtained by the aforementioned principle of the triangulation, causing the problem that a value of distance measured shifts from a correct value.

On the contrary, the optical distance-measuring devices 1, 21, 31, and 41 according to the aforementioned embodiments can suppress the occurrence of the sliding as described above by possessing the structure of preventing the above-described lens sliding. Thus, it is possible to prevent the distance measurement accuracy from decreasing against much heat used during reflow.

[Supplementary Remarks]

The present embodiment can be expressed as follows.

An optical distance-measuring device is an optical distance-measuring device that measures a distance to an object subject to distance measurement, including: a light-emitting element mounted on a mounting member; a light-emitting lens, formed from a light-transmitting resin, that irradiates the object subject to distance measurement with light emitted from the light-emitting element; a light-receiving element, mounted on the mounting member, that detects a position of convergence of light reflected by the object subject to distance measurement; a light-receiving lens, formed from a light-transmitting resin, that causes the reflected light to converge onto the light-receiving element; light-transmitting resin members that causes the light-emitting element and the light-receiving element to be sealed therewith; a first light-shielding resin member that causes the light-transmitting resin members to be sealed therewith; a lens frame, formed from metal, that has the light-emitting lens and the light-receiving lens provided thereto; and a second light-shielding resin member that causes the lens frame and the first light-shielding resin member to be sealed therewith, the lens frame having a plating layer on its front and back surfaces.

In the above configuration, the plating layer is formed on the front and back surfaces of the lens frame, which enhances adhesiveness between the lens frame and the light-transmitting resin that forms the light-emitting lens and the light-receiving lens. With this configuration, even when stresses work at the interfaces between the light-emitting lens and the lens frame and between the light-receiving lens and the lens frame due to ambient temperature changes caused during reflow, sliding does not occur at the interfaces. Therefore, after the reflow process, the light-emitting lens and the light-receiving lens are kept in relative position to the light-emitting element and the light-receiving element. Thus, it is possible to enhance heat resistance and distance measurement accuracy of the optical distance-measuring device.

In the optical distance-measuring device, the plating layer is formed by Au—Pd plating.

In the above configuration, Au—Pd plating is used. This effectively enhances adhesiveness to the lens resin. Therefore, it is possible to prevent sliding occurred at the interfaces between the light-emitting lens and the lens frame and between the light-receiving lens and the lens frame.

A manufacturing method of an optical distance-measuring device is a method of manufacturing the optical distance-measuring device, including the steps of: subjecting the lens frame having the light-emitting lens and the light-receiving lens provided thereto to heat treatment; and then sealing the lens frame with the second light-shielding resin member.

In the above configuration, the lens frame having the light-emitting lens and the light-receiving lens provided thereto is combined with the second light-shielding resin member after a predetermined heat treatment that is equivalent to reflow, for example. This means that the heat treatment equivalent to reflow is applied to the light-emitting lens and the light-receiving lens. During this process, it is possible to release the internal stresses remaining between the light-emitting lens and the lens frame and between the light-receiving lens and the lens frame beforehand. This makes it possible to reduce the stresses generated at the interfaces between the light-emitting lens and the lens frame and between the light-receiving lens and the lens frame during reflow process.

Alternatively, the present embodiment can be expressed as follows.

An optical distance-measuring device is an optical distance-measuring device that measures a distance to an object subject to distance measurement, including: a light-emitting element mounted on a mounting member; a light-emitting lens, formed from a light-transmitting resin, that irradiates the object subject to distance measurement with light emitted from the light-emitting element; a light-receiving element, mounted on the mounting member, that detects a position of convergence of light reflected by the object subject to distance measurement; a light-receiving lens, formed from a light-transmitting resin, that causes the reflected light to converge onto the light-receiving element; light-transmitting resin members that causes the light-emitting element and the light-receiving element to be sealed therewith; a first light-shielding resin member that covers the light-transmitting resin member so as to form an interior space that allows the light emitted from the light-emitting element to reach the light-emitting lens and an interior space that allows the reflected light entered from the light-receiving lens to reach the light-receiving element; a lens frame, formed from metal, that retains the light-emitting lens and the light-receiving lens; and a second light-shielding resin member that causes the lens frame and the first light-shielding resin member to be sealed therewith, the lens frame having an asperity structure on its front and back surfaces at least in an area where the light-emitting lens and the light-receiving lens are formed.

In the above optical distance-measuring device, it is preferable that the asperity structure is formed by Au—Pd plating.

In the above configuration, Au—Pd plating is used to form the asperity structure. This effectively enhances adhesiveness to the lens resin. Therefore, it is possible to prevent sliding occurred at the interfaces between the light-emitting lens and the lens frame and between the light-receiving lens and the lens frame.

In the above optical distance-measuring device, it is preferable that the asperity structure is formed by pearskin finishing.

In the above configuration, the aforementioned light-transmitting resin gets into the fine asperity structure formed by pearskin finishing. This makes it possible to enhance adhesiveness between the light-emitting lens and the lens frame and adhesiveness between the light-receiving lens and the lens frame. Thus, it is possible to prevent sliding occurred at the interfaces between the light-emitting lens and the lens frame and between the light-receiving lens and the lens frame during reflow process.

In the above optical distance-measuring device, it is preferable that the lens frame has (a) retaining holes that retain the light-emitting lens and the light-receiving lens, respectively, and (b) slit holes provided around the retaining holes, and that the slit holes are filled with the light-transmitting resin used to form the light-emitting lens and the light-receiving lens.

In the above configuration, the slit holes are formed around the retaining holes of the lens frame, and the slit holes are filled with the light-transmitting resin used to form the light-emitting lens and the light-receiving lens. This causes the lens frame to get caught in the light-emitting lens and the light-receiving lens through the slit holes. This securely fixes the light-emitting lens and the light-receiving lens to the lens frame. Thus, it is possible to prevent sliding occurred at the interfaces between the light-emitting lens and the lens frame and between the light-receiving lens and the lens frame during reflow process.

When the optical distance-measuring device is thermally expanded or contracted, stress caused by the expansion or contraction works on the lens frame. If the degree of stress is more than the degree of adhesion between the light-emitting lens and the lens frame and between the light-receiving lens and the lens frame, outer regions of the light-emitting lens and the light-receiving lens are peeled off at the interfaces where the light-emitting lens and the light-receiving lens are adhered to the surface of the lens frame. In the slit holes filled with the light-transmitting resin, there exist no interfaces between the light-emitting lens and the surface of the lens frame and between the light-receiving lens and the surface of the lens frame. Thus, the advance of peeling can be stopped by the slit holes.

In the above optical distance-measuring device, it is preferable that the slit holes comprise at least two slit holes provided for each of the light-emitting lens and the light-receiving lens.

In the above configuration, at least two slit holes are formed for each of the light-emitting lens and the light-receiving lens. This makes it possible to stably fix the light-emitting lens and the light-receiving lens. Therefore, it is possible to enhance strength of the prevention of sliding.

In the above optical distance-measuring device, the slit holes are preferably such that a slit hole-to-retaining hole distance between the slit hole and the retaining hole is not smaller than a slit hole-to-slit hole distance between the slit holes adjacent to each other.

In the above configuration, with regard to the aforementioned peeling taking place in the region between the adjacent slit holes, the nearer to the slit holes the region is, the more the advance of the peeling is suppressed by the light-transmitting resin filled into both of the adjacent slit holes. Therefore, the peeling can be considered to spread from a region between the adjacent slit holes toward the retaining hole so as to form a circle having a diameter approximating to the slit hole-to-slit hole distance. Therefore, with the configuration in which the slit hole-to-retaining hole distance is not smaller than the slit hole-to-slit hole distance, it is possible to prevent the peeling from spreading over the retaining hole. Thus, it is possible to avoid change of the relative position between the light-emitting lens and the light-emitting element and change of the relative position between the light-receiving lens and the light-receiving element due to stresses caused by the peeling.

In the above optical distance-measuring device, it is preferable that the slit hole-to-retaining hole distance is equal to the slit hole-to-slit hole distance.

In the above configuration, the slit hole-to-retaining hole distance is equal to the slit hole-to-slit hole distance. Therefore, it is possible to prevent the peeling from spreading over the retaining hole. Further, it is possible to readily set the positions of the retaining holes and the slit holes in relation to the slit hole-to-retaining hole distance and the slit hole-to-slit hole distance. Therefore, by setting the slit hole-to-slit hole distance to be as small as possible and setting the slit hole-to-retaining hole distance accordingly, it is possible to optimally decrease the areas of the light-emitting lens and the light-receiving lens.

In the above optical distance-measuring device, it is preferable that a slit hole-to-slit hole distance between the slit holes adjacent to each other is not smaller than a thickness of the lens frame.

If the slit hole-to-slit hole distance is not smaller than the thickness of the lens frame, a slit-to-slit region formed between the adjacent slit holes has strength of such a degree that it can resist stress working in a direction orthogonal to a direction of a diameter of the light-emitting lens and the light-receiving lens. On the contrary, if the slit hole-to-slit hole distance is smaller than the thickness of the lens frame, strength of the slit-to-slit region decreases to such a degree that it cannot resist stress working in the above-described direction. As a result, the slit-to-slit region deforms to such an extent that the slit hole-to-slit hole distance becomes smaller. Accordingly, the region between the slit hole and the retaining hole also deforms. In view of this, in the above configuration, the slit hole-to-slit hole distance is equal to the thickness of the lens frame. This makes it possible to avoid such deformation.

Another optical distance-measuring device is an optical distance-measuring device that measures a distance to an object subject to distance measurement, including: a light-emitting element mounted on a mounting member; a light-emitting lens, formed from a light-transmitting resin, that irradiates the object subject to distance measurement with light emitted from the light-emitting element; a light-receiving element, mounted on the mounting member, that detects a position of convergence of light reflected by the object subject to distance measurement; a light-receiving lens, formed from a light-transmitting resin, that causes the reflected light to converge onto the light-receiving element; light-transmitting resin members that causes the light-emitting element and the light-receiving element to be sealed therewith; a first light-shielding resin member that covers the light-transmitting resin member so as to form an interior space that allows the light emitted from the light-emitting element to reach the light-emitting lens and an interior space that allows the reflected light entered from the light-receiving lens to reach the light-receiving element; a lens frame, formed from metal, that has the light-emitting lens and the light-receiving lens provided thereto; and a second light-shielding resin member that causes the lens frame and the first light-shielding resin member to be sealed therewith, wherein in at least either positions (i) between the light-emitting lens and the first light-shielding resin member and between the light-receiving lens and the first light-shielding resin member or positions (ii) positions between the light-emitting lens and the second light-shielding resin member and between the light-receiving lens and the second light-shielding resin member, gaps are formed to avoid contact of the light-emitting lens and the light-receiving lens with the first and second light-shielding resin members due to thermal expansion.

In the above optical distance-measuring device, it is preferable that the lens frame has retaining holes that retain the light-emitting lens and the light-receiving lens, respectively, and each of the retaining holes has a plurality of recesses.

In the above configuration, each of the retaining holes has a plurality of recesses, into which the aforementioned light-transmitting resin is filled. This securely fixes the light-emitting lens and the light-receiving lens to the lens frame. With this configuration, it is possible to enhance adhesiveness between the light-emitting lens and the lens frame and adhesiveness between the light-receiving lens and the lens frame against the stresses responsible for the sliding due to temperature changes during the reflow process.

In the optical distance-measuring device, it is preferable that a thin film is provided on a front surface and/or a back surface of the lens frame, and the thin film is formed from a light-transmitting resin that is used to form the light-emitting lens and the light-receiving lens.

In the above configuration, the thin film formed from a light-transmitting resin that is used to form the light-emitting lens and the light-receiving lens is provided on a front surface and/or a back surface of the lens frame. This enhances adhesiveness between the metallic lens frame and the first and second light-shielding resin members. This makes it possible to prevent the occurrence of sliding of the lens frame.

The electronic device is equipped with any of the above-described optical distance-measuring devices.

Thus, the optical distance-measuring device, when installed in a personal computer, home electric appliances used in a kitchen, and sanitary apparatuses, can detect a distance to a user to control devices and can be used as a sensor that controls electronic devices by functioning as a non-contact switch or a non-contact controller.

The present invention is not limited to the aforementioned embodiments and is susceptible of various changes within the scope of the accompanying claims. That is, embodiments obtained by suitable combinations of technical means changed within the scope of the accompanying claims are also included within the technical scope of the present invention.

INDUSTRIAL APPLICABILITY

An optical distance-measuring device of the present invention can be suitably used when installed in electronic devices by reflow soldering.

REFERENCE SIGNS LIST

| Reference Signs List | |
|---|---|
| 1 | Optical distance-measuring device |
| 2 | Light-emitting element |
| 3 | Light-receiving element |
| 4 | Leadframe (mounting member) |
| 5 | Light-emitting lens |
| 6 | Light-receiving lens |
| 7 | Light-emitting side first mold (light-transmitting resin member) |
| 8 | Light-receiving side first mold (light-transmitting resin member) |
| 9 | Second mold (first light-shielding resin member) |
| 10 | Third mold (Second light-shielding resin member) |
| 10a | Aperture |
| 11a | Plating layer |
| 11b | Asperity structure |
| 11-15 | Lens frame |
| 13a, 13b | Retaining holes |
| 13c | Lens slit (slit hole) |
| 14a, 14b | Retaining holes |
| 14c | Recess |
| 21 | Optical distance-measuring device |
| 31 | Optical distance-measuring device |
| 41 | Optical distance-measuring device |
| 42 | Lens-equipped lens frame |
| 43 | Thin film section |
| 51 | Personal computer (electronic device) |
| G | Gap |

The invention claimed is:

1. An optical distance-measuring device that measures a distance to an object subject to distance measurement, comprising:

a light-emitting element mounted on a mounting member;

a light-emitting lens, formed from a light-transmitting resin, that irradiates the object subject to distance measurement with light emitted from the light-emitting element;

a light-receiving element, mounted on the mounting member, that detects a position of convergence of light reflected by the object subject to distance measurement;

a light-receiving lens, formed from a light-transmitting resin, that causes the reflected light to converge onto the light-receiving element;

light-transmitting resin members that causes the light-emitting element and the light-receiving element to be sealed therewith;

a first light-shielding resin member that covers the light-transmitting resin member so as to form an interior space that allows the light emitted from the light-emitting element to reach the light-emitting lens and an interior space that allows the reflected light entered from the light-receiving lens to reach the light-receiving element;

a lens frame, formed from metal, that retains the light-emitting lens and the light-receiving lens; and a second light-shielding resin member that causes the lens frame and the first light-shielding resin member to be sealed therewith, the lens frame having an asperity structure on its front and back surfaces at least in an area where the light-emitting lens and the light-receiving lens are formed.

2. The optical distance-measuring device according to claim 1, wherein the asperity structure is formed by Au—Pd plating.

3. The optical distance-measuring device according to claim 1, wherein the asperity structure is formed by pearskin finishing.

4. The optical distance-measuring device according to claim 1, wherein the lens frame has (a) retaining holes that retain the light-emitting lens and the light-receiving lens, respectively, and (b) slit holes provided around the retaining holes, and the slit holes are filled with the light-transmitting resin used to form the light-emitting lens and the light-receiving lens.

5. The optical distance-measuring device according to claim 4, wherein the slit holes comprise at least two slit holes provided for each of the light-emitting lens and the light-receiving lens.

6. The optical distance-measuring device according to claim 5, wherein the slit holes are such that a slit hole-to-retaining hole distance between the slit hole and the retaining hole is not smaller than a slit hole-to-slit hole distance between the slit holes adjacent to each other.

7. The optical distance-measuring device according to claim 6, wherein the slit hole-to-retaining hole distance is equal to the slit hole-to-slit hole distance.

8. The optical distance-measuring device according to claim 5, wherein a slit hole-to-slit hole distance between the slit holes adjacent to each other is not smaller than a thickness of the lens frame.

9. The optical distance-measuring device according to claim 1, wherein the lens frame has retaining holes that retain the light-emitting lens and the light-receiving lens, respectively, and each of the retaining holes has a plurality of recesses.

10. The optical distance-measuring device according to claim 1, wherein a thin film is provided on a front surface and/or a back surface of the lens frame, and the thin film is formed from a light-transmitting resin that is used to form the light-emitting lens and the light-receiving lens.

11. An electronic device including an optical distance-measuring device according to claim 1.

12. An optical distance-measuring device that measures a distance to an object subject to distance measurement, comprising:

a light-emitting element mounted on a mounting member;

a light-emitting lens, formed from a light-transmitting resin, that irradiates the object subject to distance measurement with light emitted from the light-emitting element;

a light-receiving element, mounted on the mounting member, that detects a position of convergence of light reflected by the object subject to distance measurement;

a light-receiving lens, formed from a light-transmitting resin, that causes the reflected light to converge onto the light-receiving element;

light-transmitting resin members that causes the light-emitting element and the light-receiving element to be sealed therewith;

a first light-shielding resin member that covers the light-transmitting resin member so as to form an interior space that allows the light emitted from the light-emitting element to reach the light-emitting lens and an interior space that allows the reflected light entered from the light-receiving lens to reach the light-receiving element;

a lens frame, formed from metal, that has the light-emitting lens and the light-receiving lens provided thereto; and a second light-shielding resin member that causes the lens frame and the first light-shielding resin member to be sealed therewith, wherein in at least either positions (i) between the light-emitting lens and the first light-shielding resin member and between the light-receiving lens and the first light-shielding resin member or (ii) positions between the light-emitting lens and the second light-shielding resin member and between the light-receiving lens and the second light-shielding resin member, gaps are formed to avoid contact of the light-emitting lens and the light-receiving lens with the first and second light-shielding resin members due to thermal expansion.

13. The optical distance-measuring device according to claim 12, wherein the lens frame has retaining holes that retain the light-emitting lens and the light-receiving lens, respectively, and each of the retaining holes has a plurality of recesses.

14. The optical distance-measuring device according to claim 12, wherein a thin film is provided on a front surface and/or a back surface of the lens frame, and the thin film is formed from a light-transmitting resin that is used to form the light-emitting lens and the light-receiving lens.

15. An electronic device including an optical distance-measuring device according to claim 12.

* * * * *